(12) United States Patent
Adachi et al.

(10) Patent No.: US 8,320,394 B2
(45) Date of Patent: *Nov. 27, 2012

(54) RADIO COMMUNICATION SYSTEM, TERMINAL AND PACKET

(75) Inventors: Tomoko Adachi, Urayasu (JP); Kiyoshi Toshimitsu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 990 days.

This patent is subject to a terminal disclaimer.

(21) Appl. No.: 11/953,510

(22) Filed: Dec. 10, 2007

(65) Prior Publication Data

US 2008/0095095 A1    Apr. 24, 2008

Related U.S. Application Data

(63) Continuation of application No. 10/243,895, filed on Sep. 16, 2002, now Pat. No. 7,408,929.

(30) Foreign Application Priority Data

Sep. 28, 2001  (JP) .................................. 2001-304704

(51) Int. Cl.
*H04L 12/56*   (2006.01)
*H04J 1/16*    (2006.01)

(52) U.S. Cl. ......... 370/419; 370/252; 370/315; 370/389

(58) Field of Classification Search .................. 370/389, 370/315, 252, 419
See application file for complete search history.

(56) References Cited

U.S. PATENT DOCUMENTS

| | | | |
|---|---|---|---|
| 4,939,726 A | | 7/1990 | Flammer et al. |
| 5,781,534 A | * | 7/1998 | Perlman et al. ............... 370/248 |
| 5,926,101 A | | 7/1999 | Dasgupta |
| 6,046,978 A | | 4/2000 | Melnik |
| 6,674,738 B1 | | 1/2004 | Yildiz et al. |
| 6,675,208 B1 | * | 1/2004 | Rai et al. ........................ 709/224 |
| 6,996,132 B1 | * | 2/2006 | Tolety ............................ 370/517 |
| 2001/0012296 A1 | * | 8/2001 | Burgess et al. ............... 370/392 |
| 2003/0067912 A1 | * | 4/2003 | Mead et al. .................... 370/389 |
| 2003/0115345 A1 | * | 6/2003 | Chien et al. ................... 709/229 |

FOREIGN PATENT DOCUMENTS

| | | |
|---|---|---|
| JP | 4-341031 | 11/1992 |
| JP | 9-8808 | 1/1997 |
| JP | 09-98185 | 4/1997 |
| JP | 11-261599 | 9/1999 |
| JP | 2000-151608 | 5/2000 |
| JP | 2001-244864 | 9/2001 |

OTHER PUBLICATIONS

Ying-Dar Lin, et al., "Multihop Wireless IEEE 802.11 LANs: A Prototype Implementation", ICC '99, 1999 International Conference on Communications, vol. 3, 1999, pp. 1568-1572.
Weinmiller et al. Performance Study of Access control in Wireless LANs—IEEE 802.11 DFWMAC and ETSI RES 10 Hiperlan, Jun. 1997, Mobile Networks and Applications, vol. 2, Issue 1, pp. 55-67.
Seungjoon Lee; Chongkwon Kim; Neighbor supporting ad hoc multicast routing protocol, Aug. 11, 2000, Mobile and Ad Hoc Networking and Computing, 2000. MobiHOC. 2000 First Annual Workshop, pp. 37-44.

* cited by examiner

*Primary Examiner* — John Pezzlo
(74) *Attorney, Agent, or Firm* — Oblon, Spivak, McClelland, Maier & Neustadt, L.L.P.

(57) ABSTRACT

A radio communication system includes a plurality of radio communication terminals, in which a first radio communication terminal stores, in a first field contained in a header of a radio communication packet, address information indicating at least one radio communication terminal to which the radio communication packet is directly transmitted, and a second terminal relays the radio communication packet with reference to the address information stored in the first field. The header of the radio communication packet includes a second field which stores address information indicating a final destination terminal and a third field which stores address information indicating the first terminal as a sending source.

6 Claims, 17 Drawing Sheets

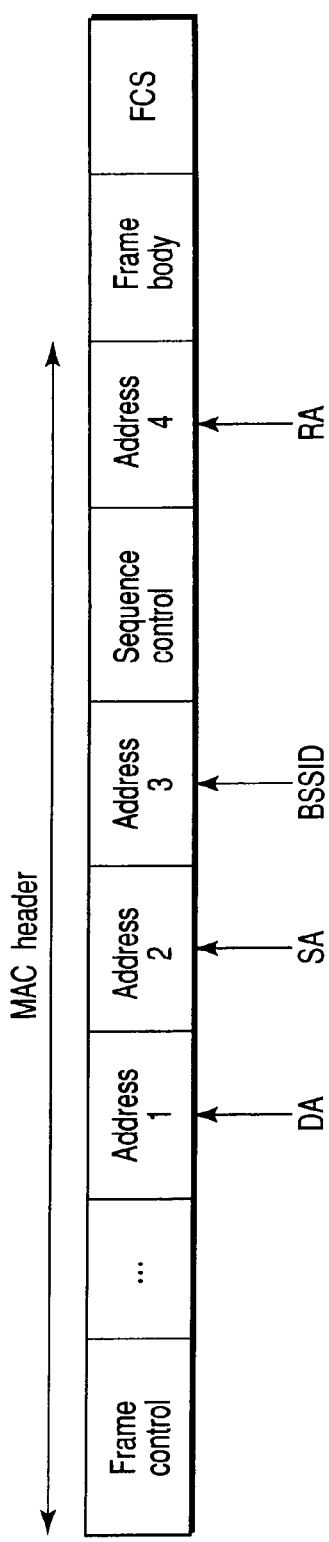
F I G. 4
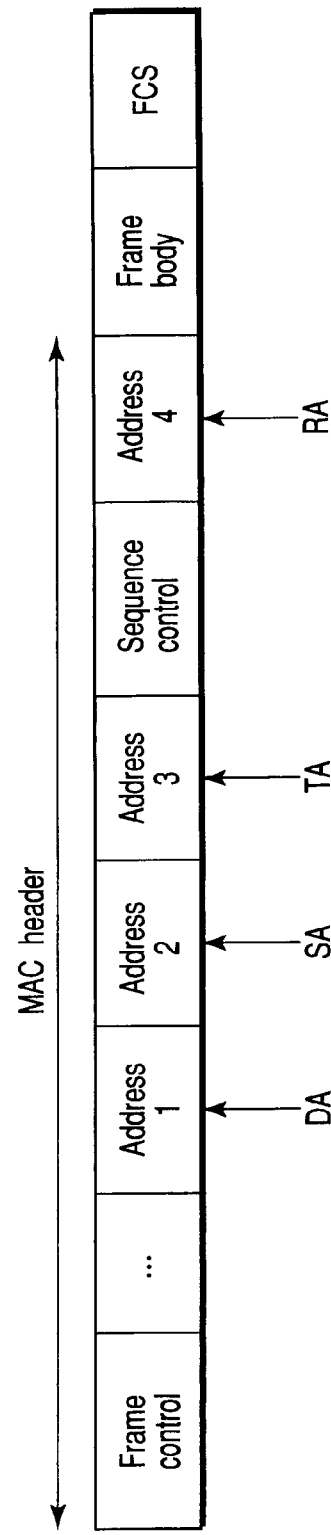
F I G. 7

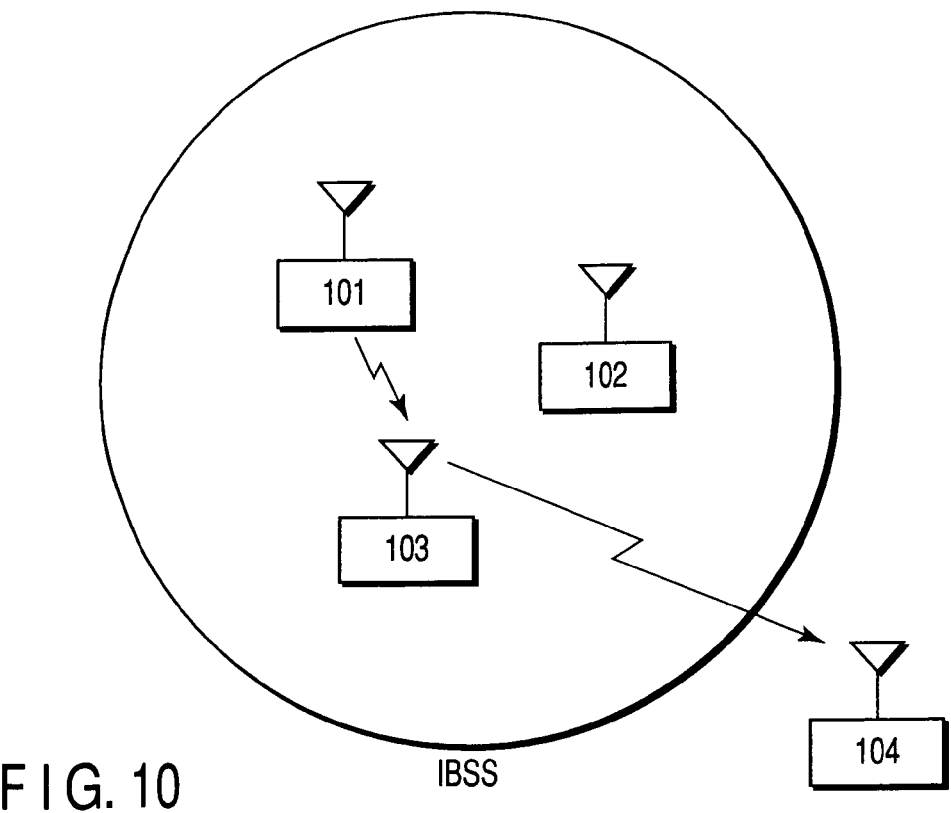
F I G. 10
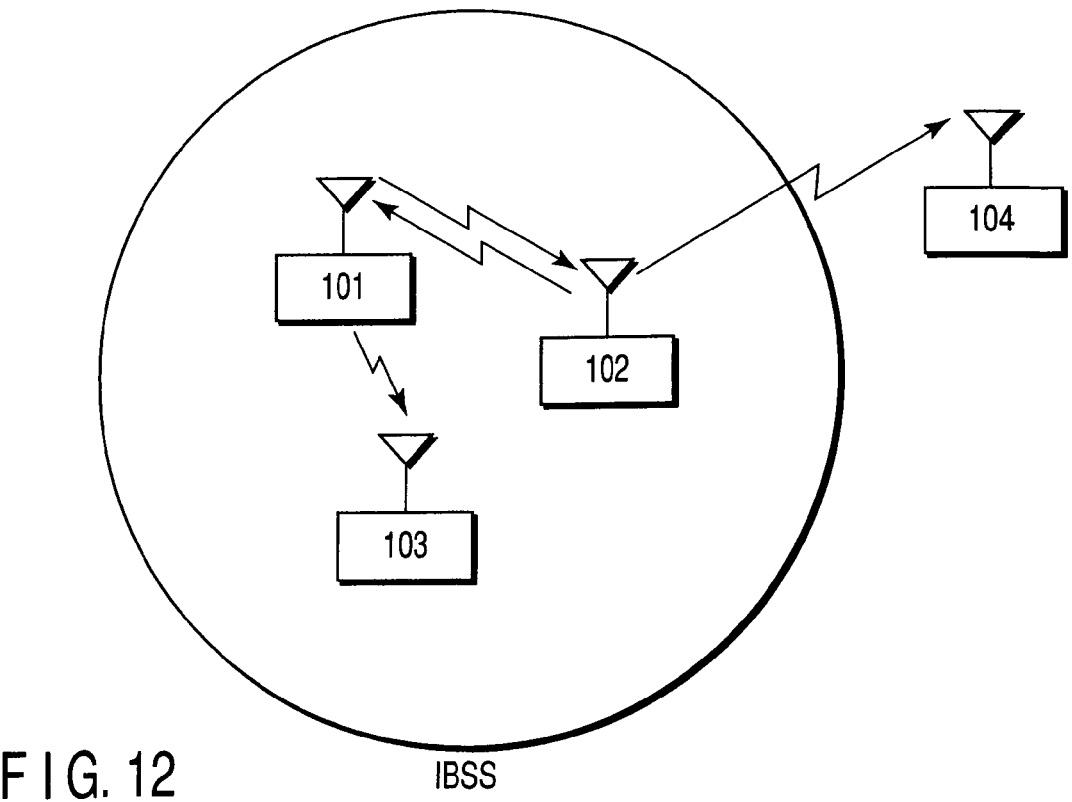
F I G. 12

Repeater station 101

| DA | RA | Accessible station (Receiving level) |
|---|---|---|
| 104 | 102 | 102(High) |

Repeater station 102

| DA | RA | Accessible station (Receiving level) |
|---|---|---|
| 104 | 104 | 101(High) |
| 103 | 101 | |

Repeater station 103

| DA | RA | Accessible station (Receiving level) |
|---|---|---|
| | | 101(Low) |

Repeater station 104

| DA | RA | Accessible station (Receiving level) |
|---|---|---|
| | | 102(High) |

FIG. 13

Repeater station 102

| DA | RA | Accessible station (Receiving level) | Authenticated station |
|---|---|---|---|
| 105 | 105 | 101(High) | 101 |

FIG. 15

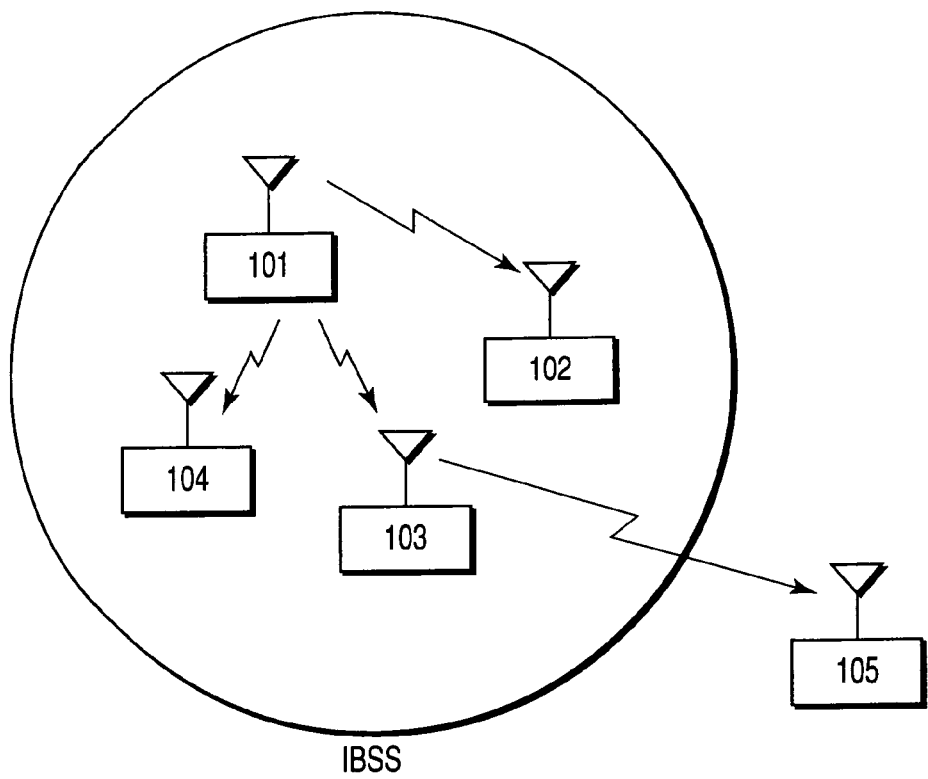
F I G. 17
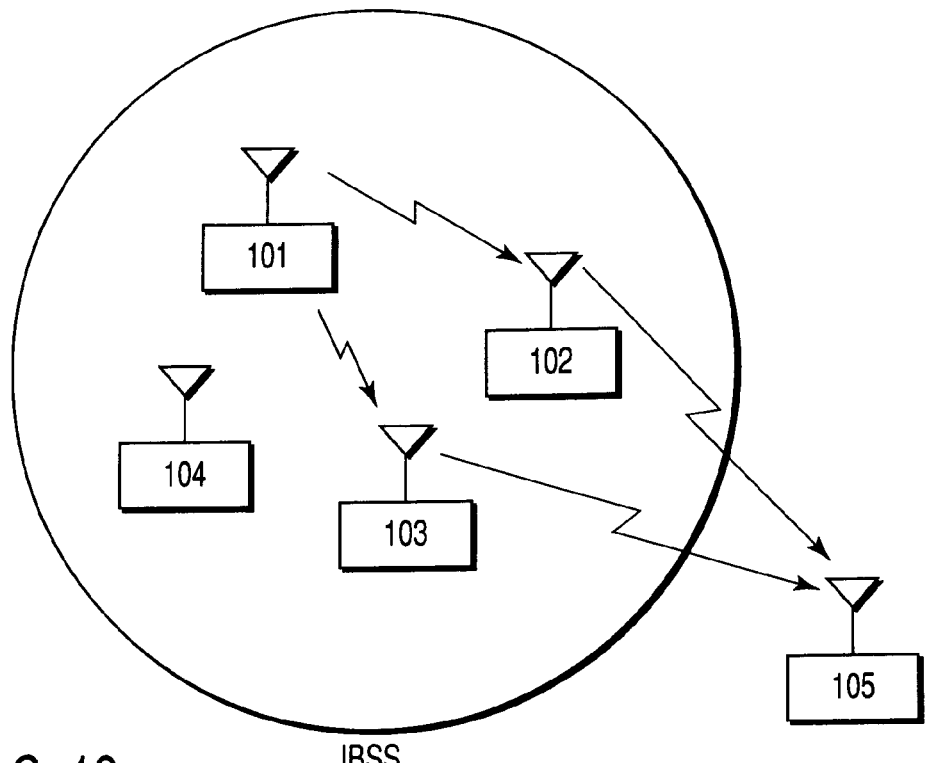
F I G. 19

Repeater station 101
| DA | RA | Accessible station (Receiving level) |
|---|---|---|
| 105 | 102 | 102(Low) |
| 105 | 103 | 103(Low) |
↓ Update
| DA | RA | Accessible station (Receiving level) |
|---|---|---|
| 105 | 102 | 102(Low) |
| 105 | 103 | 103(High) |
F I G. 23
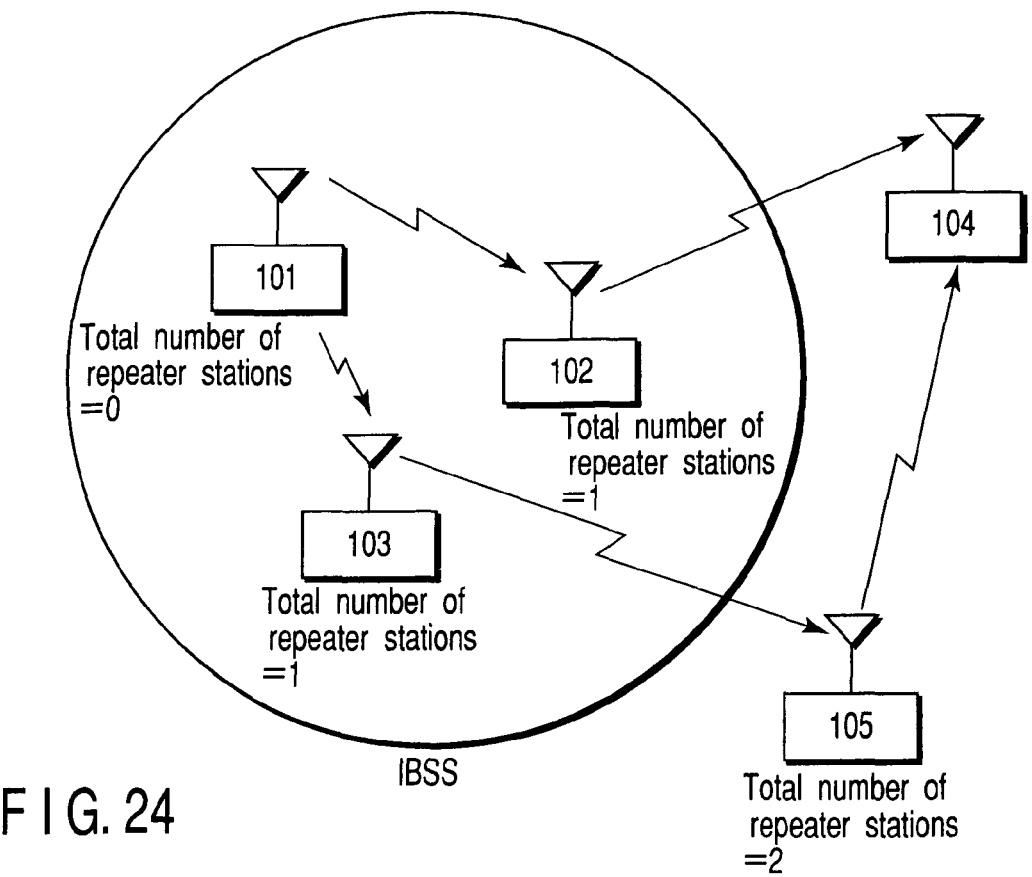
F I G. 24

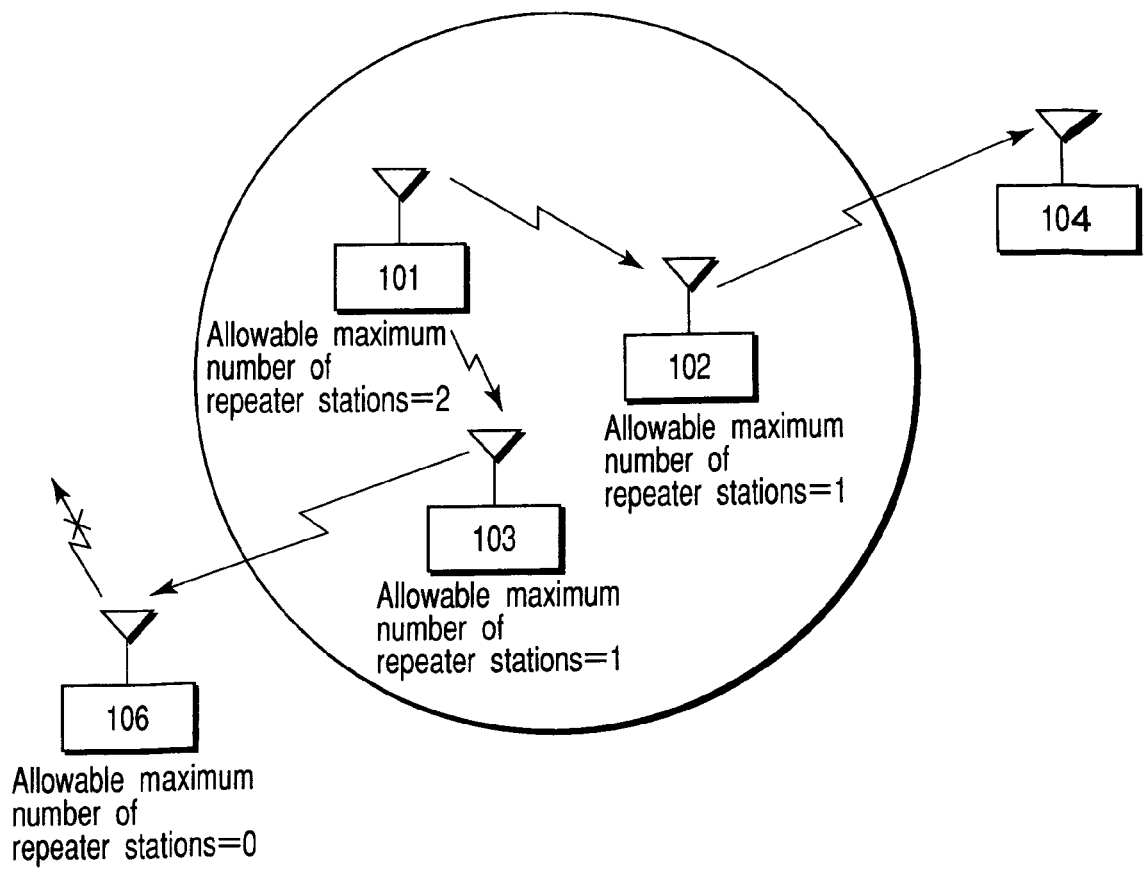
F I G. 26

N: Maximum number of repeater stations

RADIO COMMUNICATION SYSTEM, TERMINAL AND PACKET

CROSS-REFERENCE TO RELATED APPLICATIONS

This application is a continuation of U.S. application Ser. No. 10/243,895, filed Sep. 16, 2002, and is based upon and claims the benefit of priority from the prior Japanese Patent Application No. 2001-304704, filed Sep. 28, 2001, the entire contents of each of which are incorporated by reference.

BACKGROUND OF THE INVENTION

1. Field of the Invention

The present invention relates to a radio communication system, terminal and packet for multihop communication.

2. Description of the Related Art

A communication system, in which radio communication terminals execute communications, using another or other radio communication terminals as repeater stations, is called a "multihop communication system". In this system, each radio communication terminal can generate and transmit information, and can also function as a repeater station.

A network that enables communications between first and second radio communication terminals is an ad hoc network. Communications between the first terminal and a repeater terminal, between repeater terminals, and between a repeater terminal and the second terminal are part of the communications executed in the ad hoc network. IBSS (Independent Basic Service Set) stipulated in the IEEE802.11 local area wireless network system (ISO/TEC 8802-11:1999 (E) ANSI/IEEE Std 802.11, 1999 edition) is known as a type of ad hoc network.

Referring to FIG. 1, a description will be given the IEEE802.11 local area wireless network system for enabling communications between terminals. The local area wireless system shown in FIG. 1 is IBSS. In IBSS, a system including only two terminals (e.g. terminals 901 and 902) is a minimum system configuration.

In the ad hoc network in which communications are executed between a plurality of terminals, to transmit data to a destination terminal located in a far place, there are cases where data is directly transmitted to the destination terminal with high communication power, and where another terminal is used as a repeater station via which data is transmitted to the destination terminal. The latter case is multihop communication.

In general, when terminal stations are used as repeater stations and multihop communications are executed via the terminal stations, using IBSS, four addresses are necessary, i.e., an address assigned to a destination repeater station to which a data packet is transmitted directly, an address assigned to an originating repeater station from which the data packet is transmitted directly, an address assigned to the final destination terminal to which the data packed is transmitted, and an address assigned to a sending source terminal by which the packet data is generated.

However, in the conventional IBSS shown in FIG. 1, only three address fields are used, and hence all the above-mentioned four addresses cannot be designated.

Accordingly, in a conventional radio communication terminal, address control concerning IBSS multihop communications cannot be executed using the MAC (Media Access Control) layer level, and hence a level higher than the MAC level must be used to execute the address control.

BRIEF SUMMARY OF THE INVENTION

The present invention has been developed in light of the above, and aims to easily realize multihop communications based on the MAC layer level, without changing the existing basic configuration of the multihop communications but by simply adding an address control function for relaying a radio communication data packet.

To satisfy the aim, according to an aspect of the invention, there is provided a radio communication system in which at least one of a plurality of radio communication terminals relays a radio communication packet including a header, comprising:

a first radio communication terminal which is included in the plurality of radio communication terminals and stores, in a first field contained in the header of the radio communication packet, address information indicating at least one radio communication terminal to which the radio communication packet is directly transmitted; and a second radio communication terminal which is included in the plurality of radio communication terminals and relays the radio communication packet with reference to the address information stored in the first field, the header of the radio communication packet including a second field which stores address information indicating a final destination terminal and a third field which stores address information indicating the first radio communication terminal as a sending source.

According to another aspect of the invention, there is provided a radio communication terminal which is included in a plurality of radio communication terminals and can relay a radio communication packet including a header, comprising:

a relaying module configured to relay the radio communication packet with reference to address information stored in a first field contained in the header of the radio communication packet, the address information of the first field indicating at least one radio communication terminal to which the radio communication packet is directly transmitted, the header of the radio communication packet including a second field which stores address information indicating a final destination terminal and a third field which stores address information indicating the first radio communication terminal as a sending source.

According to yet another aspect of the invention, there is provided a radio communication packet to be transmitted from a first radio communication terminal to a second radio communication terminal via at least one third radio communication terminal other than the first radio communication terminal and the second radio communication terminal, each of the first radio communication terminal, the second radio communication terminal, and the third radio communication terminal being able to generate and transmit information, and also to serve as a repeater station, comprising:

a first field which stores address information indicating the third radio communication terminal to which the radio communication packet is directly transmitted;

a second field which stores address information indicating the second radio communication terminal as a final destination terminal; and a third field which stores address information indicating the first radio communication terminal as a sending source.

BRIEF DESCRIPTION OF THE SEVERAL VIEWS OF THE DRAWING

FIG. 4 is a view illustrating a structure of a data packet including a MAC header, employed in a first embodiment of the invention;

FIG. 7 is a view illustrating the structure of a data packet including a MAC header, employed in a second embodiment of the invention;

FIG. 10 is a schematic diagram illustrating a case where multihop communication is executed between radio communication terminals according to a third embodiment of the invention;

FIG. 12 is a schematic diagram illustrating a case where multihop communication is executed between radio communication terminals according to a fourth embodiment of the invention;

FIG. 13 is a view illustrating routing tables to be referred to by the radio communication terminals of the fourth embodiment if the terminals serve as repeater stations;

FIG. 15 is a view illustrating a routing table to be referred to by the radio communication terminal of the fifth embodiment if the terminal serves as a repeater station;

FIG. 17 is a schematic diagram illustrating a case where multihop communication is executed between radio communication terminals according to a seventh embodiment of the invention;

FIG. 18 is a view illustrating the structure of a data packet including a MAC header, employed in the seventh embodiment of the invention;

FIG. 19 is a schematic diagram illustrating a case where multihop communication is executed between radio communication terminals according to an eighth embodiment of the invention;

FIG. 23 is a view useful in explaining another case where when multihop communication is executed using multicasting, the routing table of a radio communication terminal according to the ninth embodiment is updated;

FIG. 24 is a schematic diagram illustrating a case where multihop communication is executed between radio communication terminals according to a tenth embodiment of the invention;

FIG. 26 is a schematic diagram illustrating a case where multihop communication is executed between radio communication terminals according to an eleventh embodiment of the invention;

DETAILED DESCRIPTION OF THE INVENTION

Radio communication systems, terminals, and packets according to embodiments of the inventions will be described with reference to the accompanying drawings.

Figure 1:
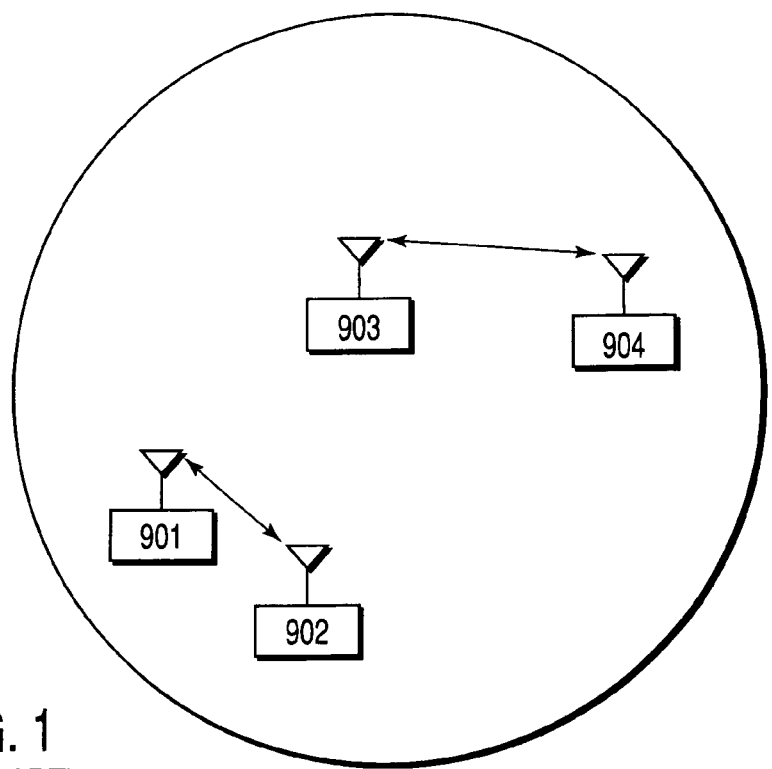
FIG. 1 is a schematic diagram illustrating the IBSS configuration of the IEEE802.11 local area wireless network system for enabling communications between conventional radio communication terminals.
Figure 2:
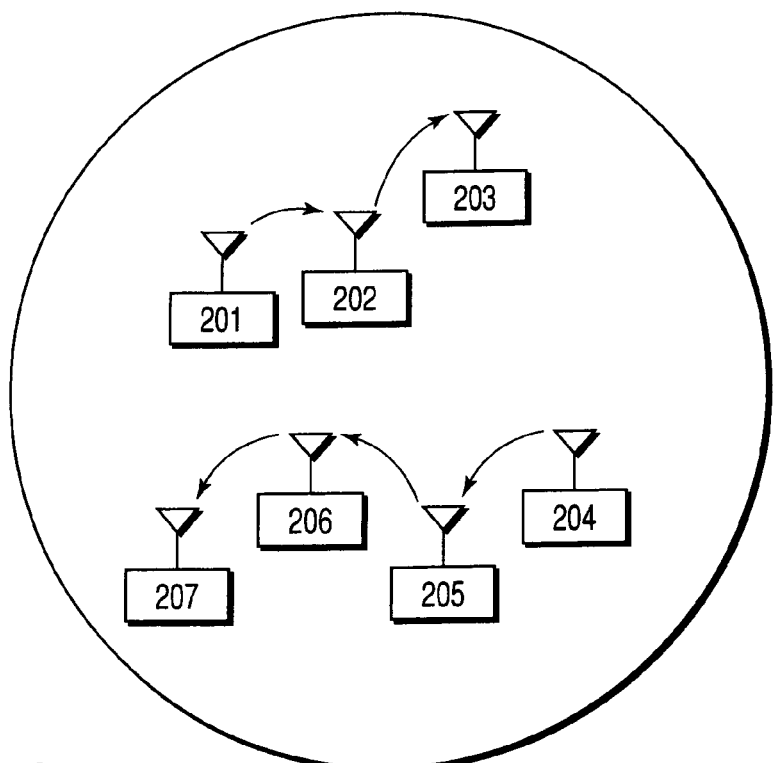
FIG. 2 is a schematic diagram illustrating cases where multihop communication is executed between radio communication terminals according to embodiments of the present invention.

FIG. 2 is a schematic diagram illustrating cases where multihop communication is executed between radio communication terminals according to embodiments of the present invention. In one of the cases of FIG. 2, multihop communication is executed from a terminal 201 to a terminal 203, while in the other case, multihop communication is executed from a terminal 204 to a terminal 207.

When multihop communication is executed from the terminal 201 to the terminal 203, a terminal 202 serves as a repeater station. On the other hand, when multihop communication is executed from the terminal 204 to the terminal 207, terminals 205 and 206 serve as repeater stations.

As shown in FIG. 2, in multihop communication, to transmit information from a sending source terminal to a destination terminal, another terminal is (or other terminals are) used as a repeater station (or repeater stations) for relaying the information.

Figure 3:
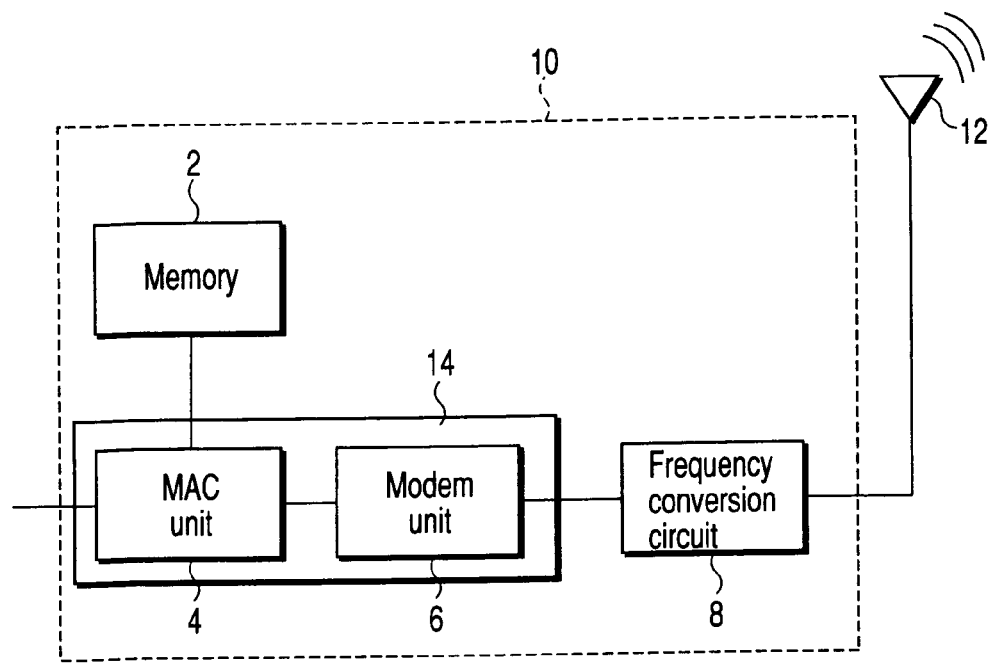
FIG. 3 is a block diagram illustrating a communication function module housed in a radio communication terminal according to embodiments of the present invention.

FIG. 3 is a block diagram illustrating a communication function module 10 housed in a radio communication terminal according to embodiments of the present invention.

As shown in FIG. 3, the communication function module 10 housed in the radio communication terminal comprises a memory 2, baseband processing module 14, frequency conversion circuit 8 and radio antenna 12. The baseband processing module 14 includes MAC (Media Access Control) unit 4 and modem unit 6.

The memory 2 is connected to the MAC unit 4 for providing the circuit with a working storage, frame buffer, etc. The MAC unit 4 generates a MAC header to be attached to-be-transmitted data, or executes access control for a MAC frame. The modem unit 6 connected to the MAC unit 4 executes PLCP (Physical Layer Convergence Protocol) header processing, spread spectrum processing, phase modulation processing, A/D conversion, etc. The frequency conversion circuit 8 connected to the modem unit 6 converts the frequency of a transmission or received signal in a stepwise manner in order to, for example, execute internal signal processing, or emit radio waves through the radio antenna 12. The radio communication terminal constructed as above complies with, for example, the IEEE802.11 local area wireless network system.

FIRST EMBODIMENT

FIG. 4 is a view illustrating the structure of a data packet including a MAC header, employed in a first embodiment of the invention. More specifically, FIG. 4 shows a structure example of a MAC header included in a data packet that is employed in the IEEE802.11 local area wireless network system when terminals execute IBSS communications.

In IEEE802.11 that stipulates the physical layer and MAC (Media Access Control) layer, four address fields are prepared for the MAC header.

In the first embodiment, four 6-octet address fields are provided in the latter portion of the MAC header. Specifically, as shown in FIG. 4, three 6-octet address fields (address 1, address 2 and address 3), and a fourth 6-octet address field (address 4) after a sequence control field are used.

In a network consisting of infrastructure BSSs (Basic Service Sets) the above-described data packet structure is similar to the structure of a data packet that is transmitted from a base station and received by a base station as both serving repeater stations for transferring a data packet between terminal stations. However, this similar data packet structure differs from the structure of the data packet in this embodiment in address information and BSSID written in each address field.

More specifically, a destination address DA assigned to a destination terminal, a source address SA assigned to a sending source terminal that has generated and transmitted information, and BSSID as a BSS identification number are written into three address fields, i.e., address 1, address 2 and address 3, respectively. Further, a receiver address RA assigned to a repeater station to which a data packet corresponding to the information is directly transmitted is written into the other address field, i.e., address 4.

By virtue of this structure, address control for IBSS multihop communication can be executed using the MAC layer level. In other words, no higher level than the MAC layer level is necessary.

Figure 5:
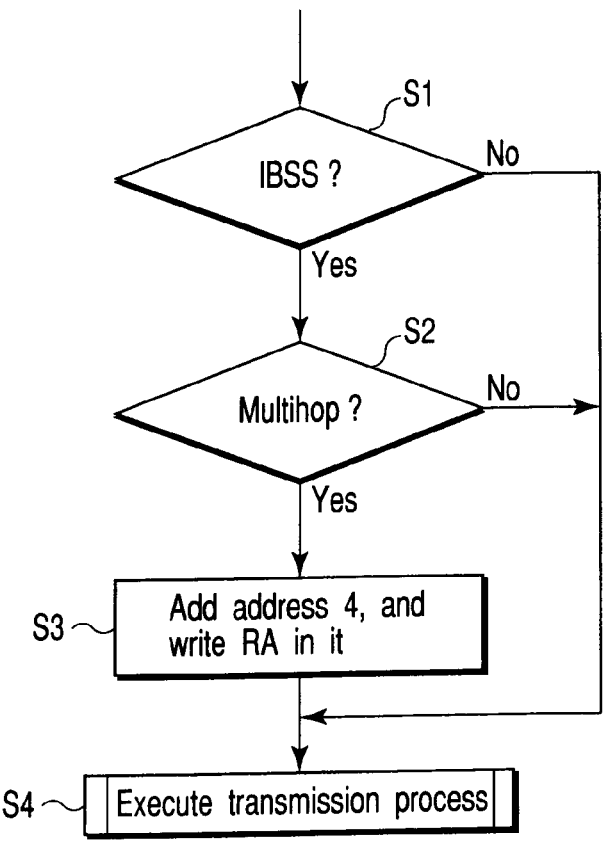
FIG. 5 is a flowchart illustrating address processing executed in a transmission process in the radio communication terminal of the first embodiment if the terminal serves to generate and transmit a data packet to realize multihop communication.

FIG. 5 is a flowchart illustrating address processing executed by the communication function module 10 of the radio communication terminal of the first embodiment if the terminal serves to generate and transmit a data packet to realize multihop communication.

In the communication function module 10, when a transmission data packet is transferred from a higher-level layer to the MAC layer, the module 10 refers to the frame control field of the transmission data packet, thereby determining whether or not the communication system of the packet is IBSS (step S1). The determination as to whether or not the communication system is IBSS is not necessarily executed each time a data packet is transmitted, and instead may be executed each time a plurality of data packets are transmitted.

If the communication system of a data packet is determined to be IBSS, the program proceeds to a step S2, whereas if the communication system is determined not to be IBSS, the program proceeds to a step S4, where the data packet is transmitted.

If it is determined at the step S1 that the communication system of a data packet is IBSS, it is determined whether or not the data packet should be transmitted to a terminal with DA by multihop communication (step S2). If the data packet is determined to be transmitted to the terminal with DA by multihop communication, the program proceeds to a step S3. If, on the other hand, the data packet is determined not to be transmitted to the terminal with DA by multihop communication, the program proceeds to a step S4, where the data packet is transmitted.

If it is determined at the step S2 that the data packet should be transmitted to the terminal with DA by multihop communication, the next terminal to which the data packet is to be transmitted is selected by a routing selection process (step S3). Subsequently, the MAC ID corresponding to the address of the selected terminal is set as RA, a 6-octet area is secured as address 4 in the MAC header of the data packet, and RA is written into the area (step S3). After that, the data packet is transmitted (step S4).

Figure 6:
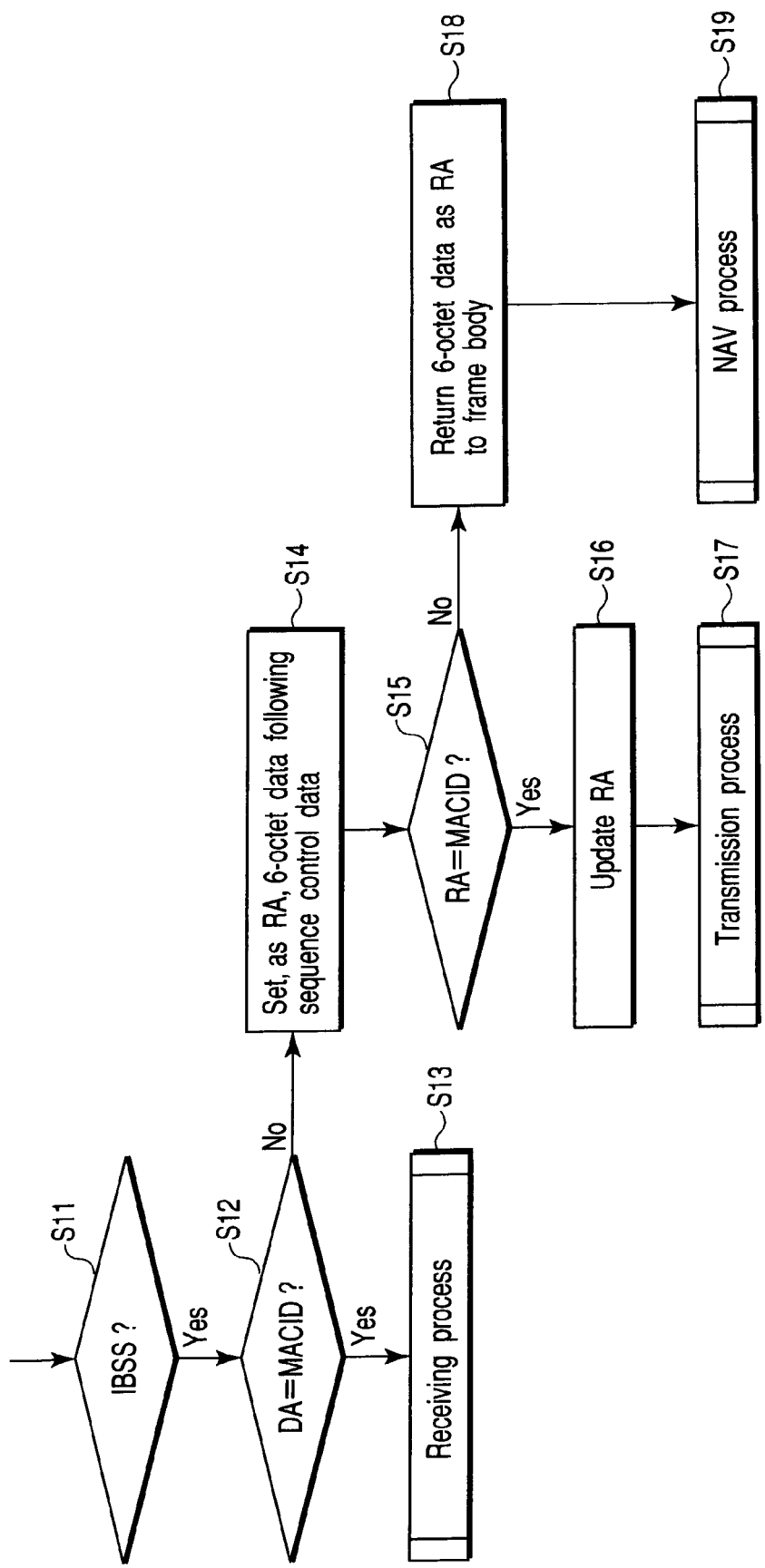
FIG. 6 is a flowchart illustrating address control executed in a receiving process in the radio communication terminal of the first embodiment if the terminal serves as a repeater station to realize multihop communication.

FIG. 6 is a flowchart illustrating address control executed in a receiving process in the radio communication terminal of the first embodiment if the terminal serves as a repeater station to realize multihop communication.

Upon receiving a data packet transmitted from a certain radio communication terminal, the radio communication terminal of the first embodiment (i.e., the repeater station) determines whether or not its transmission system is IBSS, referring to the frame control field of the data packet (step S11). The determination as to whether or not the communication system is IBSS is not necessarily executed each time a data packet is received, and instead may be executed each time a plurality of data packets are received.

If the radio communication terminal as the repeater station determines that the communication system of the received data packet is IBSS, the terminal then determines whether or not the DA contained as information in the data packet is identical to its MAC ID or station itself (step S12). If the DA is identical to the MAC ID, a normal receiving process is executed (step S13).

On the other hand, if the DA is not identical to the MAC ID, NAV (Network Allocation Vector) is usually set. However, in this embodiment, instead of setting NAV, 6-octet data contained in the MAC header of the packet after the sequence control field is extracted as data for address 4, and is used as RA (step S14). One octet includes a series of eight bits.

Thereafter, the repeater station determines whether or not the RA contained as information in the data packet is identical to its MAC ID (step S15). If the RA is not identical to the MAC ID, the 6-octet data extracted as RA at the preceding step is determined to be frame body data, and is returned to the leading part of the frame body (step S18), thereby executing a usual NAV setting process (step S19). In the embodiment of the invention, the process at the step S19 is not limited to the NAV setting process.

If the 6-octet data set as RA at the step S15 is identical to the MAC-ID of the repeater station, routing control is executed to select the next terminal to which the data packet is to be transmitted (step S16). The MAC ID of the selected terminal is used as new RA, thereby updating the 6-octet data for address 4 using the new RA (step S16), and transmitting the data packet (step S17).

As described above, in this embodiment, the terminal, which has received a data packet transmitted from the terminal that has intended to execute IBSS multihop communication, refers to the MAC header of the data packet to determine whether or not the terminal itself is the final destination terminal (step S12). If the terminal itself is not the final destination terminal, the terminal transfers the received data packet to another terminal (step S17). Thus, the relay transfer of a radio communication data packet, i.e., multihop communication, is realized.

The operation of relaying a data packet at a terminal can be executed by the MAC layer level, as in the case where an infrastructure BSS base station serves as a repeater station. Accordingly, a repeater terminal that can easily execute multihop communications can be realized simply by adding, to the terminal, part of the address control function of an existing base station using the MAC layer.

Thus, the addition of the above-described additional function to the basic function enables communications between the terminals to be prevented from interruption even if there are terminals with no additional function coexisting with the terminals according to the embodiment in the communication system.

Specifically, if a terminal that is not in compliance with multihop communication has received a data packet to be transmitted by multihop communication, the terminal compares its address with the address (DA) of the final destination terminal in a receiving process of the MAC layer level (step S12). If DA is identical to the address of the signal-received terminal, the terminal subjects the data packet to a receiving process (step S13). If, on the other hand, DA is not identical to the address of the signal-received terminal, NAV is set (step S19).

Further, in the system including terminals compatible and incompatible with multihop communication, multihop communication can be executed at suppressed transmission power between the terminals according to the invention, thereby reducing the degree of interference in the entire system.

SECOND EMBODIMENT

FIG. 7 is a view illustrating the structure of a data packet including a MAC header, employed in a second embodiment of the invention.

In the second embodiment, elements different from those of the first embodiment will be mainly described. The second embodiment differs from the first embodiment in that an address TA (Transmitter Address) assigned to a terminal from which the data packet is directly transmitted is written, instead of the conventional BSSID, into the field of address 3 in the data packet structure for multihop communication of the first embodiment shown in FIG. 4.

Figure 8:
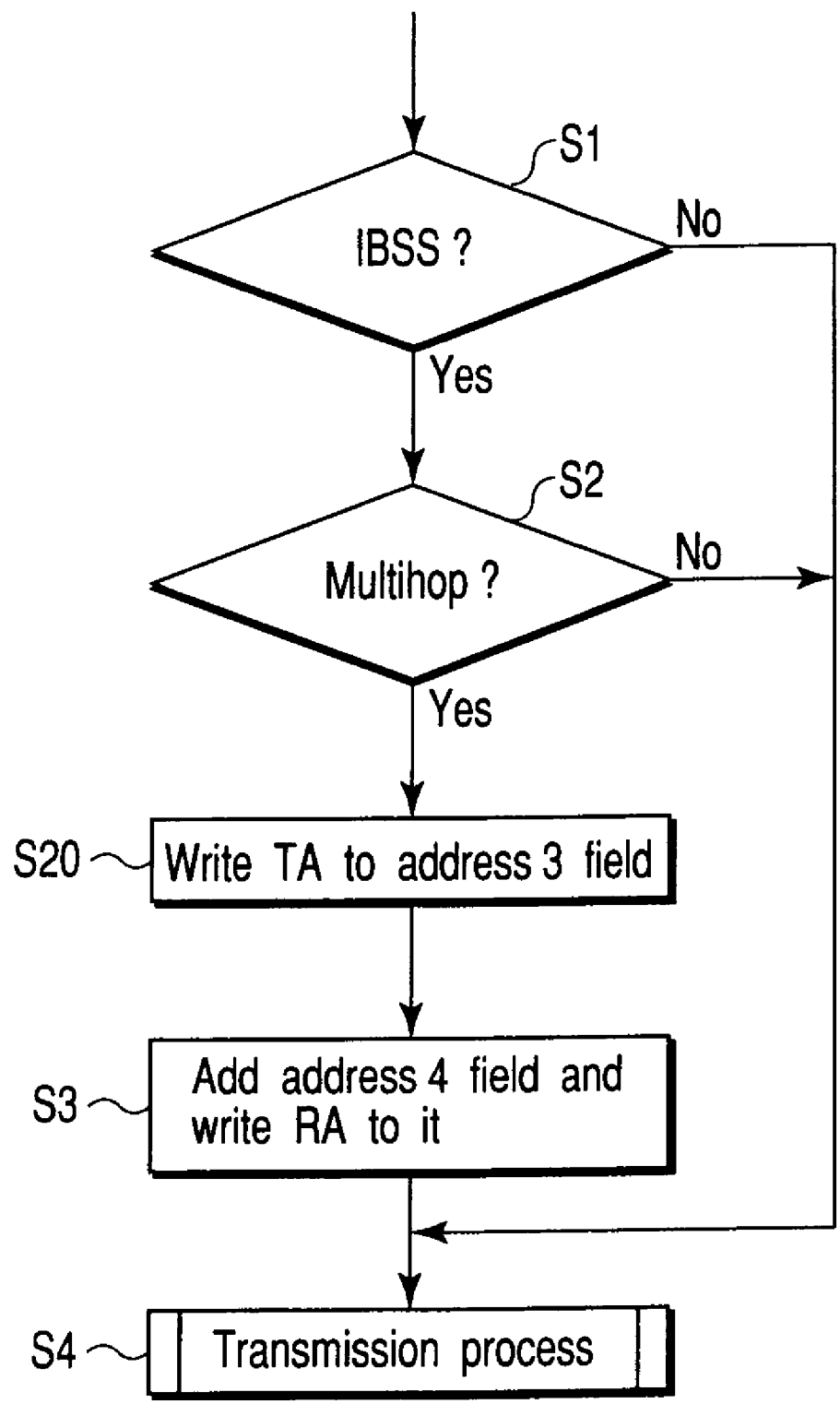
FIG. 8 is a flowchart illustrating address processing executed in a transmission process in the radio communication terminal of the second embodiment if the terminal serves to generate and transmit a data packet to realize multihop communication.

FIG. 8 is a flowchart illustrating address processing executed in a transmission process in a radio communication terminal according to the second embodiment if the terminal serves to generate and transmit a data packet to realize multihop communication.

In this embodiment, in accordance with the writing of the address TA, address processing (step S20) for also writing TA in addition to RA is added to the processing executed in the transmission process in the first embodiment shown in FIG. 5.

Specifically, if it is determined at the step S2 that the data packet is to be transmitted to the terminal with DA using multihop communication, the address of this terminal is written as the TA (step S20). After that, the program proceeds to a step S3. The other steps are similar to the address processing steps in the first embodiment.

Figure 9:
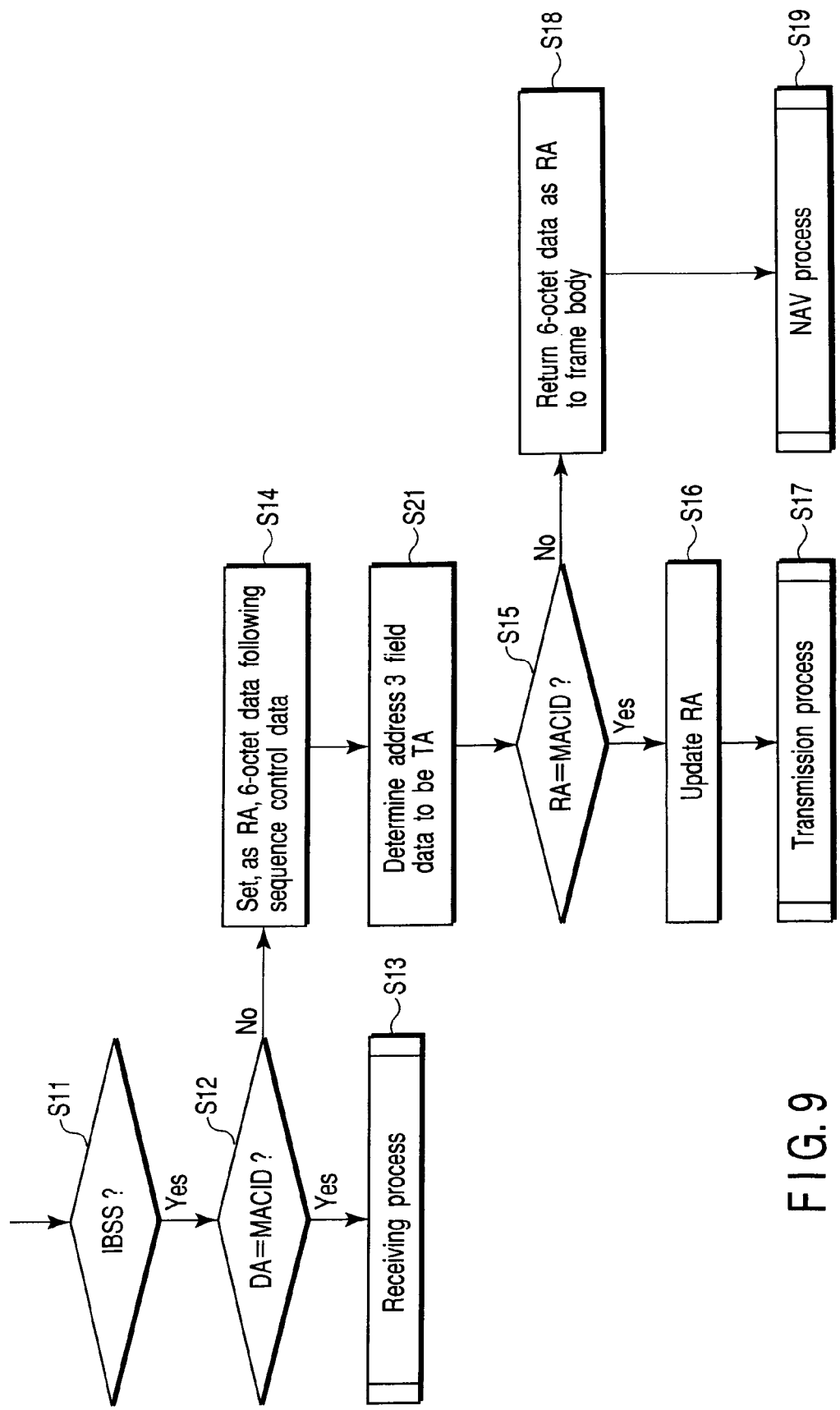
FIG. 9 is a flowchart illustrating address control executed in a receiving process in the radio communication terminal of the second embodiment if the terminal serves as a repeater station to realize multihop communication.

FIG. 9 is a flowchart illustrating address control executed in a receiving process in the radio communication terminal of the second embodiment if the terminal serves as a repeater station to realize multihop communication.

In this embodiment, in accordance with the writing of the address TA to the address field, if the 6-octet data subsequent to the sequence control field is determined to be RA in the receiving process at the repeater station of the first embodiment, it is determined that the data in the address 3 field is not BSSID but TA.

Specifically, the 6-octet data subsequent to the sequence control field of the MAC header of the received data packet is extracted as the field data of address 4 at the step S14, and the extracted address field data is set as RA. Thereafter, the field data of address 3 is determined to be TA. The order of extracting RA and determining TA may be reversed. The other steps are similar to the address control steps in the first embodiment.

Thereafter, a terminal (a repeater station) executes a process for selecting a route to a final destination terminal indicated by DA. If a determination result that indicates that a repeater station other than the present repeater station is preferable is obtained, the result is reported to the terminal that has this TA as MAC ID and is the transmitter of the received data packet. Upon receiving the report, the transmitter terminal feeds the report back to its routing selection process.

If the transmitter terminal that has transmitted the data packet to the repeater station using multihop communication, and is indicated by TA as the address 3 field data of the MAC header of the data packet, receives, from the repeater station, a report indicating that it is preferable to use a repeater station other than the present repeater station, and feeds the report back to its route selection process, the transmitter terminal may supply information indicating that the terminal has executed a feedback operation, to the preceding terminal indicated by TA as the address 3 field data of the MAC header of the data packet received by the transmitter terminal.

As described above, the writing of TA to the field of address 3 of the MAC header of a data packet to be transmitted by multihop communication enables the feedback of the result of the routing selection process executed by a repeater station, to the terminal transmitted the data packet and also to the terminal previous to the terminal that transmitted the packet. As a result, the routing table can be updated in accordance with the movement of terminals or change in radio propagation circumstances.

THIRD EMBODIMENT

A third embodiment will be described. In this embodiment, a description will be mainly given of the points different from the first embodiment. The third embodiment differs from the first embodiment in that the third embodiment employs multihop communication in which the address assigned to a terminal, to which data are to be transmitted finally, has to be a unicast address.

FIG. 10 is a schematic diagram illustrating a case where multihop communication is executed between radio communication terminals according to the third embodiment of the invention.

As shown in FIG. 10, in the case of communication using a unicast address, there exists only one destination address (DA) for a data packet. In the case of FIG. 10, a data packet is transmitted from a repeater station 101 to a repeater station 103, and then from the repeater station 103 to a repeater station 104 that is DA.

Figure 11:
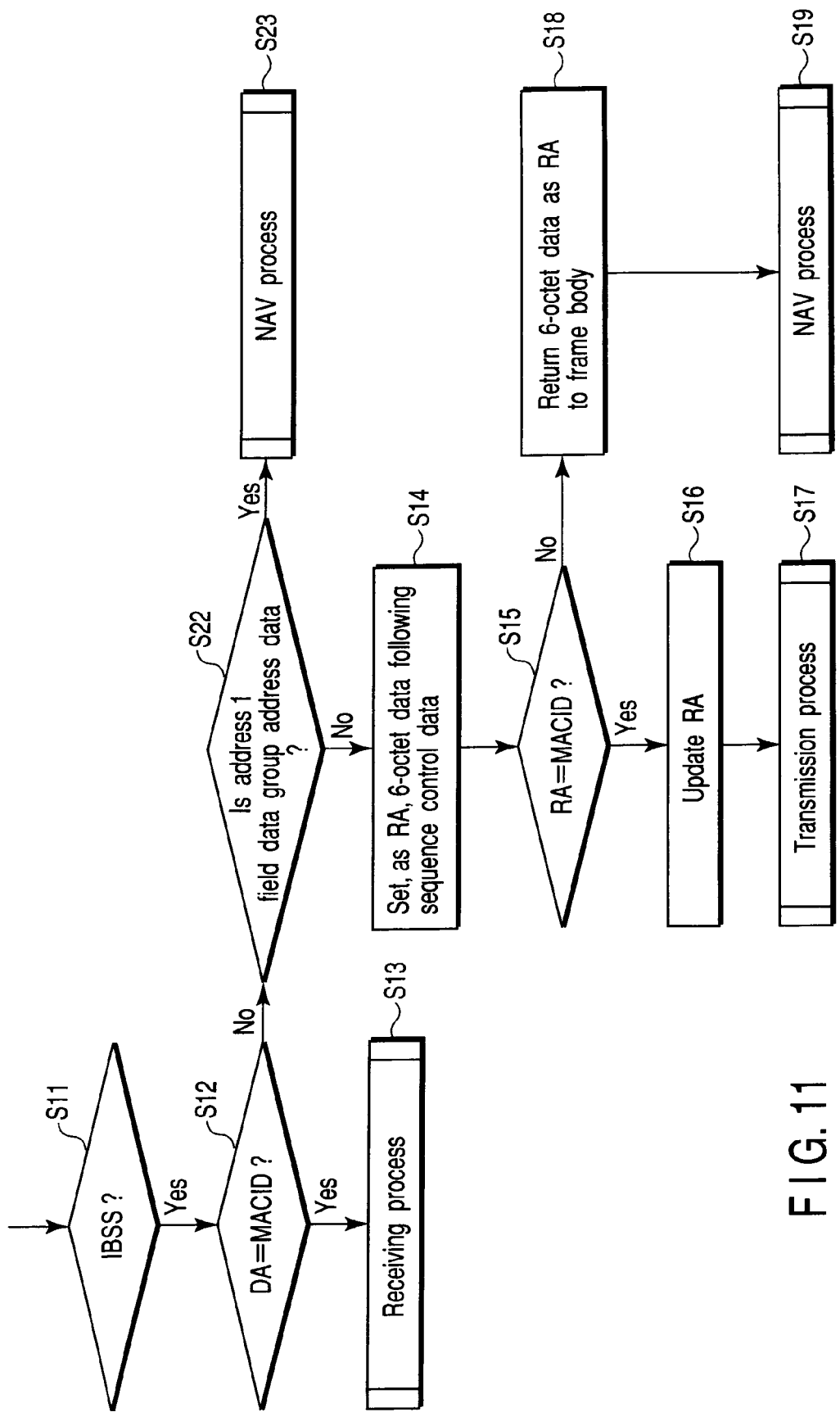
FIG. 11 is a flowchart illustrating address control executed in a receiving process in a radio communication terminal according to the third embodiment if the terminal serves as a repeater station to realize multihop communication.

FIG. 11 is a flowchart illustrating address control executed in a receiving process in a radio communication terminal according to the third embodiment if the terminal serves as a repeater station to realize multihop communication.

Also in this embodiment, it is first determined whether or not the system is IBSS (step S11), as in the address control process in the receiving process, executed by a terminal serving as a repeater station in the first embodiment shown in FIG. 6. If it is determined to be IBSS, it is determined whether or not DA is identical to the MAC ID of the repeater station (step S12).

If it is determined at the step S12 that DA is not identical to the MAC ID of the repeater station, it is first determined in this embodiment whether or not the field data DA of address 1 of the MAC header indicates group address information (step S22). "Group address" in general is an address indicating a plurality of addresses as one. If it is determined at the step S22 that the field data DA of address 1 indicates group address information, it is determined that the data packet does not contain a field for address 4, and the program promptly shifts to the NAV setting process (step S23).

If, on the other hand, the field data DA of address 1 does not indicate group address information, the program proceeds to a step S14. The other steps are similar to the address control steps in the first embodiment.

In the above-described third embodiment, it can be easily determined whether or not the data packet uses multihop communication. If the data packet does not use multihop communication, the program promptly shifts to a usual receiving process (for example, NAV setting processing).

The generating and updating of a routing table applicable to the above-described first to third embodiments will be described with reference to fourth to ninth embodiments.

FOURTH EMBODIMENT

FIG. 12 is a schematic diagram illustrating a case where multihop communication is executed between radio communication terminals according to a fourth embodiment of the invention.

When a repeater station 101 in the IBSS system has transmitted a beacon signal with a predetermined transmission power that falls within a range allowable in the system, repeater stations 102 and 103 receive the beacon signal from the repeater station 101. Each repeater station received the beacon signal records, in its routing table, that each repeater station can execute direct communication with the repeater station 101.

FIG. 13 is a view illustrating routing tables to be referred to by the radio communication terminals of the fourth embodiment if the terminals serve as repeater stations.

Each routing table stores an address (DA) assigned to the final destination repeater station, an address (RA) assigned to a direct destination repeater station, accessible stations, and the reception levels of beacon signals from the accessible stations.

In the case of FIG. 12, when the repeater stations 102 and 103 have received a beacon signal from the repeater station 101, the number 101 is written to the column for accessible stations in each routing table of the repeater stations 102 and 103. Further, whether or not the level of the received beacon signal is high is also written to each routing table of the repeater stations 102 and 103.

As a result, when the repeater station 102 or 103 has received a data packet related to multihop communication, each repeater station can use the repeater station 101 as a candidate for a repeater station to which the data packet is to be transmitted next.

Further, if the repeater station 102 has transmitted a beacon signal of a predetermined transmission power level like the repeater station 101, the repeater stations 101 and 104 receive the beacon signal from the repeater station 102. The repeater stations 101 and 104 record, in their respective routing tables, the fact that they can directly communicate with the repeater station 102, as shown in FIG. 13.

Through the above-described procedure, each repeater station updates a routing table that shows a destination repeater station or stations with which each repeater station can communicate in IBSS.

Moreover, when the repeater station 101 has transmitted its routing table to the repeater station 102, the repeater station 102 knows that it can also communicate with the repeater station 103. If the repeater station 102 would like to transmit information to the repeater station 103, the station 102 records, in its routing table, that the repeater station 101 can be a candidate for a repeater station as is shown in FIG. 13.

By transmitting a routing table to another directly accessible repeater station, each repeater station increases the amount of information concerning destination repeater stations with which each repeater station can communicate, thereby updating its routing table.

Each repeater station equipped with a routing table generated and updated as described above can appropriately select the next repeater station when the station generates a data packet for transmitting or relays a data packet using multihop communication.

FIFTH EMBODIMENT

In a fifth embodiment, the above-described routing table is updated based on a process on an authentication signal.

Figure 14:
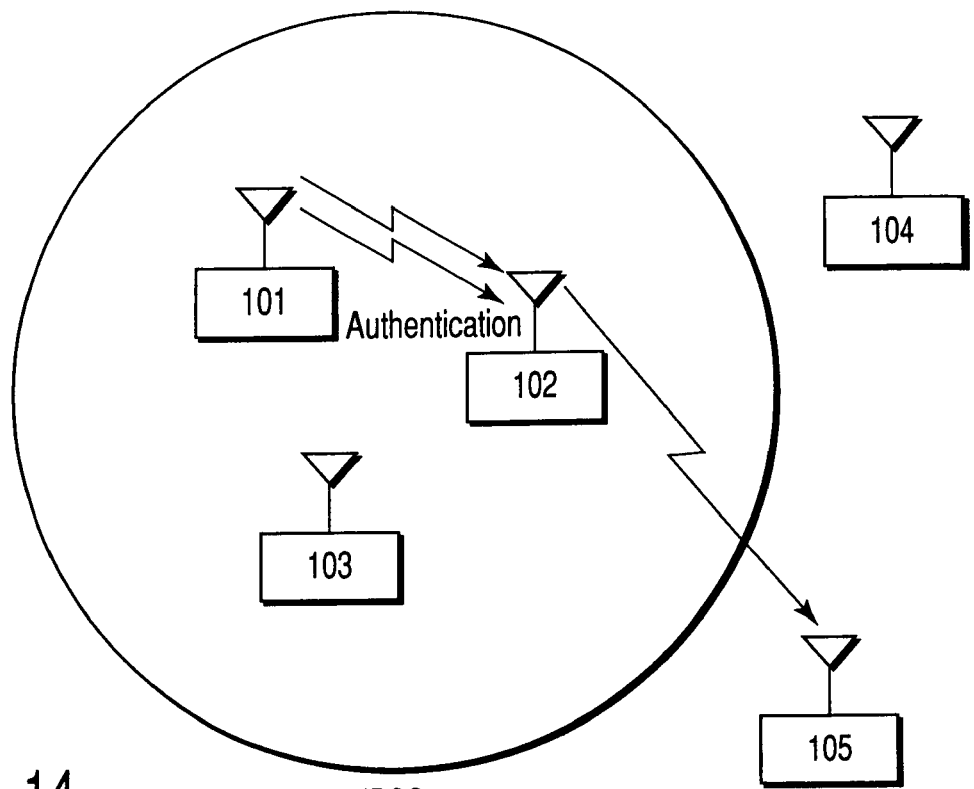
FIG. 14 is a schematic diagram illustrating a case where multihop communication is executed between radio communication terminals according to a fifth embodiment of the invention.

FIG. 14 is a schematic diagram illustrating a case where multihop communication is executed between radio communication terminals according to the fifth embodiment of the invention.

As shown in FIG. 14, the reliability of the communication channel between the repeater stations 101 and 102 is enhanced if the repeater station 101 gives authentication to the repeater station 102. In the routing table of, for example, the repeater station 101, this communication channel has a higher priority than the communication channel between the repeater stations 101 and 103 with no authentication.

For example, when a data packet is transmitted from the repeater station 101 to the repeater station 105 using multihop communication, there are two routes that depend upon whether the data packet is relayed by the repeater station 102 or 103. In this case, the repeater station 102 to which authentication was given is selected as the next repeater station.

FIG. 15 is a view illustrating a routing table to be referred to by the radio communication terminal of the fifth embodiment if the terminal serves as a repeater station. This routing table belongs to the repeater station 102.

When the repeater station 102 has received a data packet that is related to multihop communication and directed from the repeater station 104 to the repeater station 103, if the repeater station 102 has a routing table in which the communication channel between the repeater stations 101 and 102 is set to have a higher priority, or if the repeater station 101 has given authentication to the repeater station 102 as described above, the repeater station 102 chooses the repeater station 101 in preference to the repeater station 105.

In the above-described fifth embodiment, multihop communications can be realized according to the reliability of the relay communication channel, using the routing table.

SIXTH EMBODIMENT

In a sixth embodiment, the processing result of exchanging an RTS (Request to Send) signal and a CTS (Clear to Send) signal between repeater stations updates the routing table of each of the repeater station.

Figure 16:
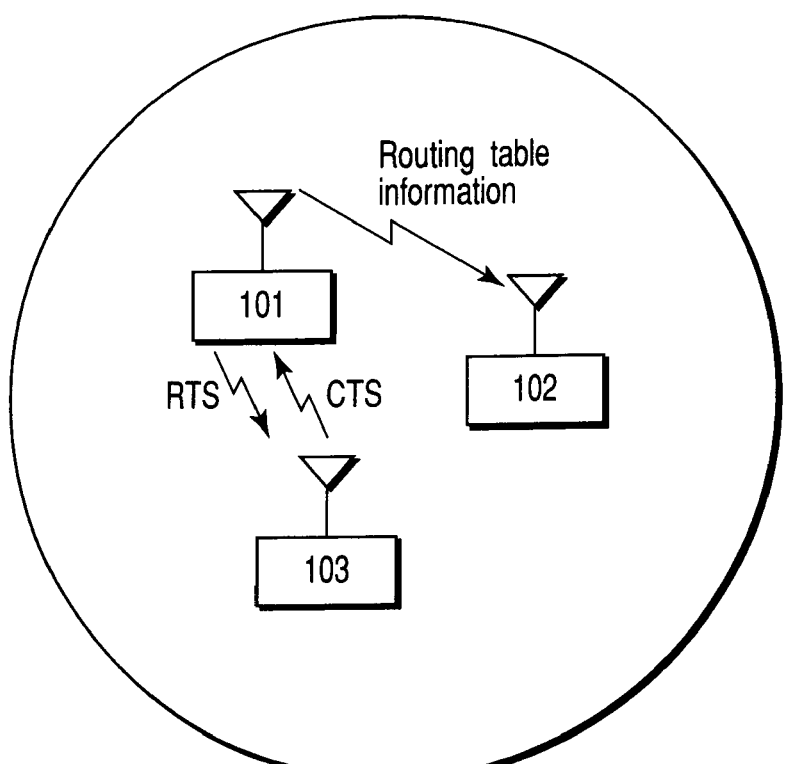
FIG. 16 is a schematic diagram illustrating a case where multihop communication is executed between radio communication terminals according to a sixth embodiment of the invention.

FIG. 16 is a schematic diagram illustrating a case where multihop communication is executed between radio communication terminals according to the sixth embodiment of the invention.

When, for example, the repeater station 101 has transmitted an RTS signal to the repeater station 103 and the repeater station 103 has received the signal as shown in FIG. 16, the repeater station 103 transmits a CTS signal corresponding to the RTS signal to the repeater station 101. In this case, if the repeater station 103 cannot receive the RTS signal from the repeater station 101 because one or both of the repeater stations have moved or the radio propagation circumstances between the repeater stations 101 and 103 have changed for some reason, the repeater station 101 determines that no CTS signal has been transmitted from the repeater station 103 after waiting for the CTS for a predetermined period of time. Further, the repeater station 101 updates the routing table by deleting the repeater station 103 from the directly accessible terminal candidates specified therein, or reducing the degree of priority of the communication channel to the repeater station 103. The repeater station 101 determines that no CTS signal has been transmitted from the repeater station 103 and updates the routing table in the same when the CTS signal transmitted from the repeater station 103 cannot be received by the repeater station 101. On the other hand, when the exchange of RTS and CTS signals succeeded, the priority of the communication channel between the repeater station 101 and 103 is given high in the routing table of repeater station 101.

The thus-updated routing table of the repeater station 101 can be transmitted from the repeater station 101 to the repeater station 102 so that the routing table of the repeater station 102 can also be updated. The sixth embodiment described above has the same advantage as that of the fifth embodiment.

SEVENTH EMBODIMENT

FIG. 17 is a schematic diagram illustrating a case where multihop communication is executed between radio communication terminals according to a seventh embodiment of the invention.

When a broadcast address is written as RA at the repeater station 101, the radio waves generated from the repeater station 101 can be received and relayed by any repeater station that the waves have reached.

If a routing table has just been generated and hence does not store any information on terminals or information used to transmit or relay a data packet related to multihop communication to the final destination terminal, the terminal of this embodiment is arranged to write a broadcast address to the data field of address 4 assigning an address to the next terminal, as shown in FIG. 18. For example, the number 1 is written as the broadcast address to all bits of the data field of address 4.

FIG. 18 is a view illustrating the structure of a data packet including a MAC header, employed in the seventh embodiment of the invention.

This structure makes it possible for a generated data packet (related to multihop communication) having possibility of reaching the final destination terminal even if none of the terminals in the radio communication system have completely closed routing tables.

It is a matter of course that the processing according to the seventh embodiment may be executed even if a routing table has been generated or updated as in the above-described fourth to sixth embodiments.

EIGHTH EMBODIMENT

FIG. 19 is a schematic diagram illustrating a case where multihop communication is executed between radio communication terminals according to an eighth embodiment of the invention.

In the fourth to sixth embodiments, when a repeater station selects, using a routing table, the next repeater station in order to transmit a data packet related to multihop communication to the final destination repeater station, there is a case where a single candidate repeater station cannot be selected, i.e., there exist a plurality of candidate repeater stations, because the stations have the same or close selection conditions.

FIG. 19 shows a case where a data packet is transmitted from the repeater station 101 to the repeater station 105 via the repeater stations 102 and 103.

Figure 20:
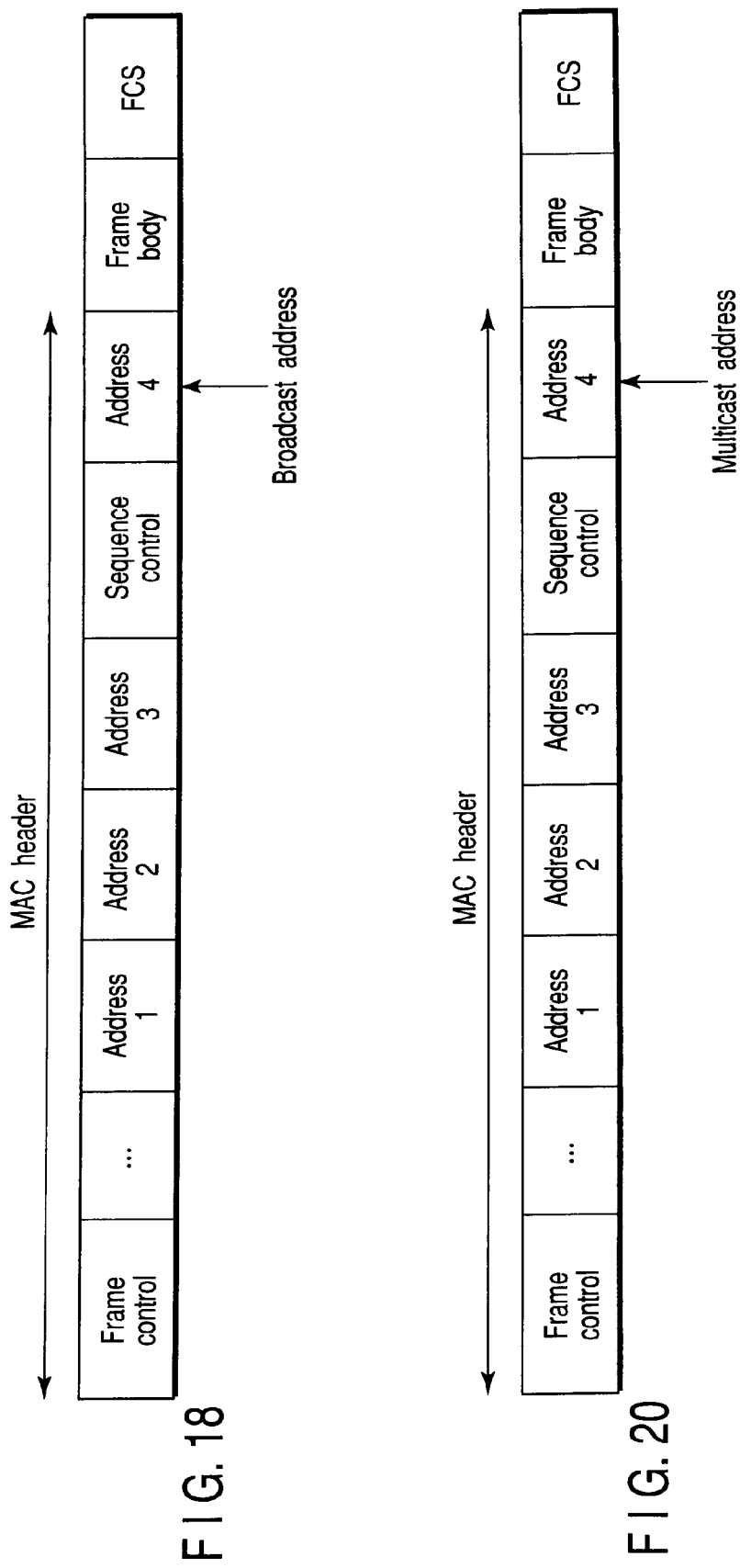
FIG. 20 is a view illustrating the structure of a data packet including a MAC header, employed in the eighth embodiment of the invention.

In this case, as shown in FIG. 20, addresses assigned to a plurality of candidate repeater stations are written in the form of multicast address information to the data field of address 4 assigning an address RA to the next terminal.

FIG. 20 is a view illustrating the structure of a data packet including a MAC header, employed in the eighth embodiment of the invention.

This structure enables the transmission of a data packet related to multihop communication via a plurality of channels. Therefore the data packet can be more reliably transmitted to the final destination repeater station.

NINTH EMBODIMENT

When a data packet related to multihop communication, the data packet being transmitted or relayed by broadcasting, has reached the final destination repeater station in the seventh embodiment, the final destination repeater station, in turn, generates and transmits a new data packet related to multihop communication to the originating repeater station as a sending source. This data packet reaches the originating repeater station through the reverse channel or route.

Figures 21, 22:
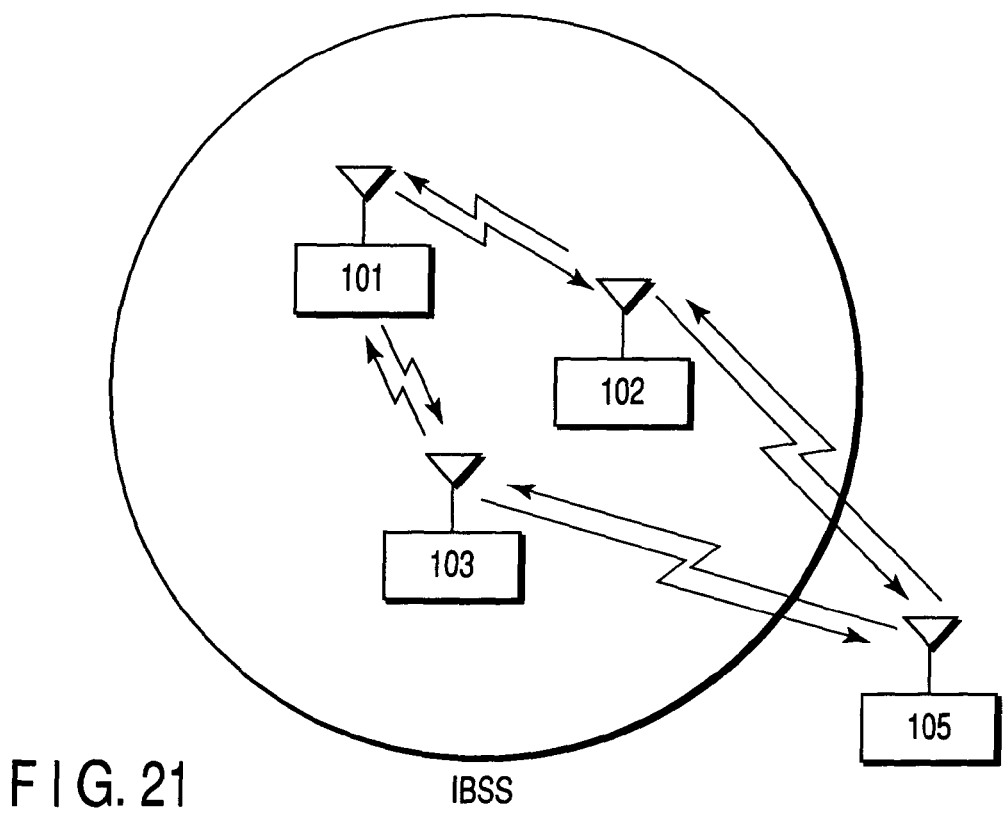
FIG. 21 is a schematic diagram illustrating a case where multihop communication is executed between radio communication terminals according to a ninth embodiment of the invention.
FIG. 22 is a view useful in explaining a case where when multihop communication is executed first by the repeater station 101, the routing table of a radio communication terminal according to the ninth embodiment is updated using broadcasting.

FIG. 21 is a schematic diagram illustrating a case where multihop communication is executed between radio communication terminals according to the ninth embodiment of the invention.

In the case of FIG. 21, the data packet transmitted from the repeater station 101 as the sending source reaches the repeater station 105 as the final destination repeater station via the repeater station 102. As an example of reverse routing, the data packet transmitted from the repeater station 105 reaches the repeater station 101 via the repeater station 103.

As a result, when a repeater station that once generated or relayed a data packet related to multihop communication to the final destination repeater station again transmits a data packet to the same final destination repeater station, the station can select a single or a plurality of candidates as the next repeater station based on the information concerning another data packet reached the station through the reverse route, thereby updating the routing table of the repeater station.

FIG. 22 is a view useful in explaining a case where, when multihop communication is executed first by the repeater station 101, the routing table of a radio communication terminal according to the ninth embodiment is updated using broadcasting.

The data packets which reach the repeater station 101 through the communication channel from the repeater stations 102 and 103 shown in FIG. 21 also give receiving information (e.g. receiving level information) from the repeater stations 102 and 103 to the repeater station 101. On the basis of the receiving information, the routing table of the repeater station 101 is updated as shown in FIG. 22. It is understood from this routing table that if the final destination repeater station is the repeater station 105, further stable data communication can be realized by selecting the repeater station 103 (not the repeater station 102) for relaying data packets.

The above-described ninth embodiment enables a more complicated communication channel network related to multihop communication to be employed.

Also, in the eight embodiment, when a data packet related to multihop communication transmitted or relayed using multicast address information has reached the final destination repeater station, the final destination repeater station may generate and transmit a new data packet to the sending source terminal, as in the above-described case using broadcast address information. This data packet reaches the sending source terminal through the reverse route.

As a result, when a repeater station, which once generated or relayed a data packet related to multihop communication to the final destination repeater station, again transmits a data packet to the same final destination repeater station, the station can select a single or a plurality of candidates for the next repeater station based on the information concerning another data packet reached there through the reverse route, thereby updating the routing table of the repeater station.

FIG. 23 is a view useful in explaining another case where when multihop communication is executed first using multicasting by the repeater station 101, the routing table of a radio communication terminal according to the ninth embodiment is updated.

As in the case of multihop communication where the repeater station 101 first uses broadcasting, the data packets which reach the repeater station 101 from the repeater stations 102 and 103 also give receiving information (e.g. receiving level information) from the repeater stations 102 and 103 to the repeater station 101. On the basis of the receiving information, the routing table of the repeater station 101 is updated as shown in FIG. 23. In the previous routing table before being updated, the receiving level of each repeater station 102 or 103 is low for the repeater station 101. However, it is understood now from the updated routing table that if the final destination repeater station is the repeater station 105, further stable data communication can be realized by selecting the repeater station 103 (not the repeater station 102) for relaying a data packet. Since the communication circumstances of radio waves change every second, a routing table more suitable for the present circumstances than the previous one can be obtained by the updating process.

If this configuration of the ninth embodiment is combined with the aforementioned configuration, a further complicated communication channel network related to multihop communication can be employed.

TENTH EMBODIMENT

A tenth embodiment is obtained by adding a field for storing the number of repeater stations to the data packet employed in each of the fourth to sixth embodiments.

FIG. 24 is a schematic diagram illustrating a case where multihop communication is executed between radio communication terminals according to the tenth embodiment of the invention.

In FIG. 24, when the repeater station 101 transmits a data packet to the repeater station 104 as the final destination, suppose that the repeater station 102 is used to relay the data packet. In this case, if the repeater station 102 transmits the data packet to the repeater station 104, and the repeater station 104 has received the data packet successfully, the repeater station 104 can know that only one repeater station (102) has been used to relay the data packet, from the fact that the data in the field for storing the number of repeater stations indicates 1.

On the other hand, if the repeater station 101 first selects the repeater station 103 as a station for relaying the data packet, it is necessary to use another repeater station (e.g., the repeater station 105) since no data packet can be transmitted directly from the repeater station 103 to the repeater station 104.

In this case, when the repeater station 104 has received the data packet transmitted from the repeater station 101 and relayed by the repeater station 105, the station 104 can know from the packet that the number of required repeater stations is 2.

Therefore, if the repeater station 104 conversely transmits a data packet related to multihop communication to the repeater station 101 as the final destination, the station 104 can select the repeater station 102 as the next station in order to select the communication channel interposed with the fewest repeater stations between the repeater stations 104 and 101.

Figure 25:
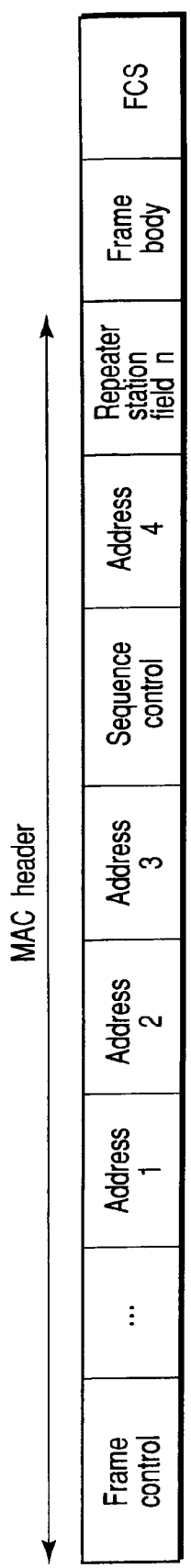
FIG. 25 is a view illustrating the structure of a data packet including a MAC header, employed in the tenth embodiment of the invention.

FIG. 25 is a view illustrating the structure of a data packet including a MAC header, employed in the tenth embodiment of the invention.

As shown in FIG. 25, the number of repeater stations is written to the repeater station field. This number indicates the total number of repeater stations through which the data packet has been relayed so far. For example, in FIG. 24, concerning a data packet transmitted from the repeater station 101 to the repeater station 104 via the repeater station 102, the total number of repeater stations is 1 (i.e., the repeater station 102). Further, in FIG. 24, concerning a data packet transmitted from the repeater station 101 to the repeater station 104 via the repeater stations 103 and 105, the total number of repeater stations is 2 (i.e., the repeater stations 103 and 105).

For example, when the repeater station 101 transmits a data packet to the repeater station 104 as the final destination, if the station 101 cannot determine which one of the two terminals (i.e., the repeater stations 102 and 103) stored in its routing table should be selected, the station 101 transmits the data packet by inputting multicast address information as the address 4 of the packet.

As described above, if the repeater station 104 has received, from the repeater station 102, a data packet storing 1 as the total number of required repeater stations, and received, from the repeater station 105, a data packet storing 2 as the total number, the repeater station 104 transmits a response frame to the repeater station 101, designating the repeater station 102 as a station for relaying the data packet. Upon receiving the response frame, the repeater station 101 stores the frame in its routing table as information indicating that the repeater station 102 should be used next time as a station for relaying a data packet to the repeater station 104 as the final destination.

Further, if the repeater station 104 is used to relay a data packet from the repeater station 101 as the sending source, and has received, from the repeater stations 102 and 105, data packets which contain the same information except for the data in the repeater station field, the station 104 compares the data items in the repeater station field, thereby stopping the relay of the data packet in which the repeater station field stores data indicating a larger number. This prevents increases in the communication of data packets that contain the same information and differ only in communication channel.

ELEVENTH EMBODIMENT

An eleventh embodiment is directed to the case of setting the upper limit for the number of repeater stations that can relay a data packet generated by a sending source repeater station.

FIG. 26 is a schematic diagram illustrating a case where multihop communication is executed between radio communication repeater stations according to the eleventh embodiment of the invention.

In FIG. 26, suppose that the allowable maximum number of repeater stations is 2 in the above-described embodiment. In the above-described embodiment, when the repeater station 101 transmits a data packet related to multihop communication to the repeater station 104 as the final destination and the repeater station 101 cannot determine which terminal should be used as a station for relaying the data packet, multicast or broadcast address information is written to the field of address 4 of the data packet. Also the allowable maximum number of repeater stations, 2, is written in the repeater station field in the MAC header of the data packet. The field of writing down this allowable maximum number of repeater stations is described latter using FIG. 27.

If the repeater station 103 that has received the data packet from the repeater station 101 does not contain, in its routing table, information on the repeater station 104, the station 103 cannot determine which repeater station should be used as the next repeater station. In this case, the repeater station 103 inputs group address information as multicast or broadcast address information, and rewrites the allowable maximum number of repeater stations as "1". This number is obtained by subtracting 1 (corresponding to the repeater station 103 itself) from the number in the repeater station field. After that, the rewritten data packet is transmitted.

Similarly, if a repeater station 106 that has received the data packet from the repeater station 103 has no information concerning the repeater station 104, the station 106 writes group address information into the data field of address 4 and rewrites the allowable maximum number of repeater stations as "0". This number is obtained by subtracting 1 (corresponding to the repeater station 106 itself) from the number in the repeater station field. Thereafter, the rewritten data packet is transmitted. If a repeater station other than the repeater station 104 has received this data packet that contains allowable maximum number of "0", the data packet cannot be further relayed and hence the relay operation is stopped.

Figure 27:
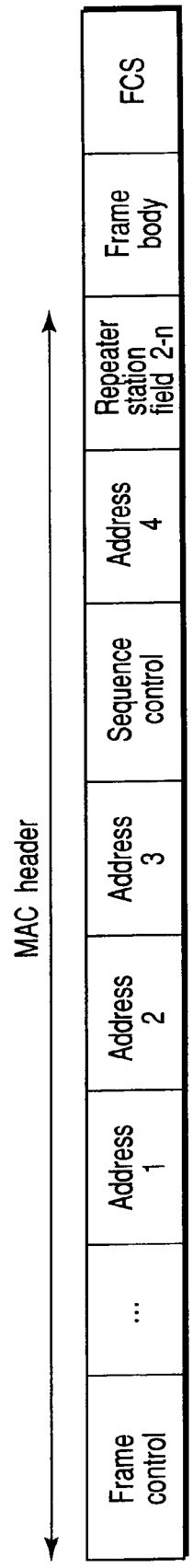
FIG. 27 is a view illustrating the structure of a data packet including a MAC header, employed in the eleventh embodiment of the invention.

FIG. 27 is a view illustrating the structure of a data packet including a MAC header, employed in the eleventh embodiment of the invention.

FIG. 27 shows a case where the allowable maximum number of repeater stations written in the repeater station field. When this allowable maximum number of repeater stations is initially set as 2, the data packet transmitted from a sending source repeater terminal can be relayed by the repeater stations twice including the transmission of the sending source repeater station.

Each time a data packet transmitted from the sending source repeater station passes through a repeater station, "1" is subtracted from the value written in the repeater station field. For example, in each data packet transmitted from the sending source repeater station 101, "2" as the initial allowable maximum number is written in the repeater station field. After this data packet is relayed by the repeater station 103, the data in the repeater station field is changed to "1". If the repeater station 106 has received the data packet and confirms, from the comparison of its MAC ID with the data packet, that the repeater station 106 is not the final destination, the station 106 executes no further relaying operation.

As described above, in the eleventh embodiment, if, for example, the routing from the sending source terminal to the final destination terminal is not established, proliferation of a data packet throughout the system is prevented. That is to say, substantially endless relaying of a data packet transmitted from the sending source terminal is prevented. The endless relaying occurs when the data packet is passed through a plurality of communication channels and relayed again and again without finding the final destination station.

TWELFTH EMBODIMENT

A twelfth embodiment is a combination of the tenth and eleventh embodiments. In the twelfth embodiment, the number of repeater stations is detected, and the relaying operation is stopped based on the allowable maximum number of repeater stations. In the tenth embodiment, the sending source terminal defines the allowable maximum number of repeater stations and writes the number into the repeater station field of a data packet when the terminal transmits the data packet.

A reference value is provided for the field that stores the number of repeater stations. Both the operation executed during a relay operation in order to detect the number of repeater stations, and the operation executed during a relay operation when the allowable maximum number of repeater stations is defined are performed by a single manner.

In this embodiment, the reference value for the repeater station field is set, for example, to "0", and the value in the repeater station field is incremented by 1 each time a relaying operation is executed. In this case, the terminal received a data packet determines that the present communication is executed for detecting the number of repeater stations, thereby relaying the data packet, if the value of the repeater station field of the data packet is higher than or equal to 0, i.e., the value is positive or 0. On the other hand, if the value is lower than 0, i.e., the value is negative, the terminal determines that the data packet has been transmitted with the allowable maximum number of repeater stations defined. The relay of the data packet is stopped if the value reaches 0. In other case, that is, the case that the reference value for the repeater station field is 0 is described after.

Figure 28:
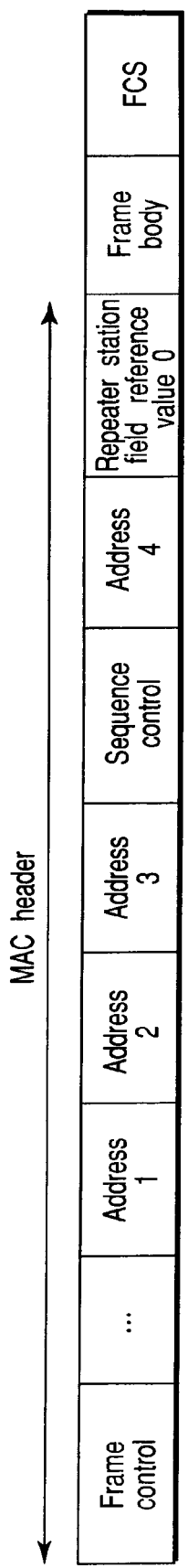
FIG. 28 is a view illustrating the structure of a data packet including a MAC header, employed in a twelfth embodiment of the invention to obtain the number of repeater stations.

FIG. 28 is a view illustrating the structure of a data packet including a MAC header, employed in the twelfth embodiment of the invention to obtain the number of repeater stations.

The repeater station field shown in FIG. 28 is written a number. The number written in the field indicates the total number of repeater stations through which the data packet has been relayed so far, or the allowable maximum number of repeater stations. FIG. 28 shows a case where the reference value 0 is written in the field. If the reference value higher than 0 or equal to 0, the reference number corresponds to the total number of repeater stations through which the data packet has been relayed so far.

When a sending source terminal transmits a data packet to detect the number of repeater stations, the initial value of the repeater station field is set to 0. Each repeater station increments, by 1, the value of the repeater station field when the station relays the data packet. As a result, each repeater station and the final destination terminal can detect the number of repeater stations existing between itself and the sending source terminal.

Figure 29:
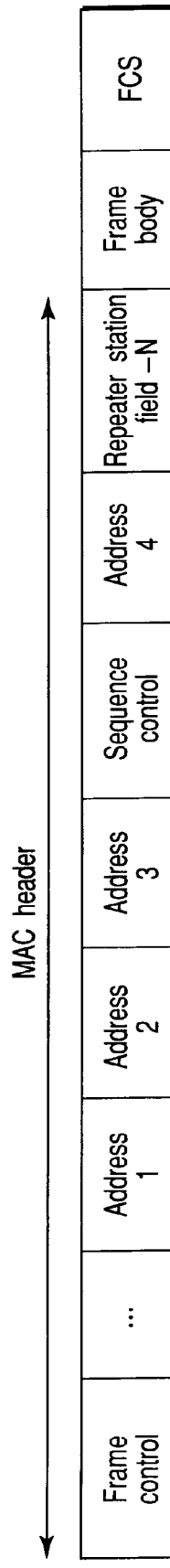
FIG. 29 is a view illustrating the structure of a data packet including a MAC header, employed in the twelfth embodiment of the invention to determine the allowable maximum number of repeater stations.

FIG. 29 is a view illustrating the structure of a data packet including a MAC header, employed in the twelfth embodiment of the invention to determine the allowable maximum number of repeater stations.

When a sending source terminal transmits a data packet, with the allowable maximum number of repeater stations defined in the terminal, this number is written as a negative value in the repeater station field. Each repeater station received the data packet increments the value of the repeater station field by 1. If the routing table of each repeater station does not store the address of the final destination terminal, each repeater station may stop the relay operation.

When defining the allowable maximum number of repeater stations from the optimal number of repeater stations in order to stop the relaying operation, it is preferable that the absolute value of the allowable maximum number is set to a value slightly higher (e.g., by 1) than the required value. This is because even if the final destination terminal is not stored in the routing table, it is possible that the final destination terminal may be included in the next repeater stations accessed using group address information.

If a repeater station received the data packet detects that the value of its repeater station field is 0, it determines that the data packet has been transmitted to detect the number of repeater stations. If a repeater station received the data packet detects that the value of the repeater station field is −1, it determines that the data packet has been transmitted with the limitation of the allowable maximum number of repeater stations and the relay of the data packet is stopped.

Even when the previous repeater station did not stop relaying the data packet in the later case and relayed the data packet rewriting its repeater station field as 0 by incrementing by 1, and the data packet is received at the next repeater station, if TA is stored in the field of address 3 as in the second embodiment, this data can be used for the above determination. If TA in the field of address 3 differs from SA in the field of address 2, it is determined that the value 0 in the repeater station field is obtained by adding "1" to the previous value. In other words, if TA in the field of address 3 differs from SA in the field of address 2, it is determined that the data packet has been transmitted with the allowable maximum number of repeater stations defined.

In the above-described twelfth embodiment, the optimal number of repeater stations existing from the sending source terminal to any optionally selected final destination terminal can be detected. Further, the allowable maximum number of repeater stations can be also set, for a data packet to be transmitted to another final destination terminal, referring to the detected number.

The advantages obtained from the above-described first to twelfth embodiments will now be described.

In communications between IBSS terminals, multihop communication can be realized additionally using the relay function employed in a BSS base station. This additional function can be easily mounted by the MAC layer level control, and is effective for making the terminals execute multihop communication promptly. The addition of the function to the basic function employed in the IBSS communication prevents interruption of communication in a system including terminals that do not correspond to the embodiments of the present invention. Further, when multihop communication is executed between terminals according to the embodiments of the invention in the system, the transmission power used in the multihop communication can be suppressed, thereby reducing the degree of interference in the entire system.

Moreover, the writing of TA in a data packet transmitted using multihop communication enables the result of a routing selection process executed by a repeater station to be fed back to the preceding repeater station transmitted the data packet, and to be also fed back to the further previous repeater stations. Accordingly, the routing table can be updated in accordance with changes in the position of each repeater station or radio propagation circumstances.

Also, in the case of multihop communication in which the address of the final destination station is set using unicast address information, if it is determined, in the step executed to determine address information during a receiving process by a terminal serving as a repeater station, that the terminal is an IBSS terminal, and DA does not correspond to the address of the repeater station, and the address information is group address information, then the data packet received is determined not to be multihop data packet, and the process is shifted to the NAV setting process. This simplifies the process executed by the terminal that has received a data packet.

Further, since each terminal generates and updates its own routing table, it can select, based on the routing table, the next terminal to which a multihop data packet is relayed or transmitted.

Where each terminal has its own routing table, the reliability of the routing tables can be enhanced by exchanging data packets concerning authentication. This enables selection of a more reliable communication channel from a plurality of communication channels, if the plurality of communication channels exists, thereby realizing reliable multihop communication.

Furthermore, RTS and CTS signals may be exchanged. This also enhances the reliability of the routing table and hence realizes reliable multihop communication.

The writing of broadcast address information into the field of address 4 enables a generated multihop data packet to reach a final destination terminal, even if the routing tables of all the terminals are not completely closed.

If a routing table stores a plurality of candidates for the next terminal, the writing of multicast address information to the field of address 4 enables a multihop data packet to be transmitted via a plurality of communication channels. This means that the data packet can be transmitted to the final destination terminal more reliably.

Also, when the terminal that has generated or relayed a multihop data packet transmits the data packet to the final destination terminal, the terminal can reduce, to, for example, one, the number of candidates for the next terminal based on information reached there through the reverse routing, thereby updating its own routing table.

The provision of a field in a multihop data packet, in which the number of repeater stations is written, and the input of information indicating the number into the routing table of each terminal enables the selection of a route with a lower number of repeater stations.

In addition, the transmission of a multihop data packet with the allowable maximum number of repeater stations defined prevents proliferation, within the communication system, of the data packet, which occurs when the data packet is passed through a plurality of communication channels and relayed again and again because of, for example, the routing from the sending source terminal to the final destination terminal is not established.

Furthermore, the optimal number of repeater stations to each final destination terminal can be detected, and further, the allowable maximum number of repeater stations can be also set for a data packet to be transmitted to another final destination terminal, referring to the detected number.

The invention is not limited to the above-described embodiments, but may be modified in various ways without departing from its scope.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication terminal which is included in a plurality of radio communication terminals and relays MAC frames, comprising:
    a receiving module configured to receive the MAC frames from one of the radio communication terminals, each of the MAC frames including a first field which is a first MAC address field indicating at least one radio communication terminal to which said each of the MAC frames is directly transmitted, a second field which is a second MAC address field indicating a final destination terminal, and a third field which is a third MAC address field indicating a source terminal which generates data of said each of the MAC frames, one of the MAC frames being a first MAC frame which is used to select a route to a final destination terminal and further including a fourth field which indicates a total number of relays which said each of the MAC frames has been relayed through;
    a first extracting module configured to extract MAC address information from the first field of said each of the received MAC frames;
    a first determining module configured to determine whether or not a MAC address of the radio communication terminal is the same as the MAC address information extracted by the first extracting module;
    a second determining module configured to determine whether or not said each of the received MAC frames is the first MAC frame if the MAC address of the radio communication terminal is determined to be the same with the MAC address information by the first determining module;
    a second extracting module configured to extract a first number from the fourth field of said each of the received MAC frames if said each of the received MAC frames is determined to be the first MAC frame by the second determining module;
    an updating module configured to update the first field of said each of the received MAC frames if the MAC address of the radio communication terminal is determined to be the same with the MAC address information by the first determining module, and further update the fourth field if said each of the received MAC frames is determined to be the first MAC frame by the second determining module, where the fourth field is updated to a second number by adding one to the first number; and
    a transmitting module configured to transmit said each of the MAC frames updated by the updating module.

2. The terminal according to claim 1
wherein said each of the MAC frames further includes a fifth field which indicates an allowable number of relays given to said each of the MAC frames, and the terminal further comprises
    a third extracting module configured to extract a third number from the fifth field of said each of the received MAC frames; and
    a stop-relaying module configured to stop relaying said each of the MAC frames if a fourth number obtained by subtracting one from the third number is zero, and the updating module is further configured to update the fifth field of said each of the MAC frames for the transmitting module if the fourth number is not zero.

3. The terminal according to claim 2, further comprising a third determining module configured to determine the allowable number of relays if said each of the received MAC frames does not include the fifth field, wherein the transmitting module transmits said each of the MAC frames including the determined allowable number of relays as the fourth field.

4. The terminal according to claim 1, wherein the first MAC address field in the first field is a group address field.

5. The terminal according to claim 1, wherein the second MAC address field in the second field is a group address field.

6. The terminal according to claim 1, the updating module further configured to determine the second number to be one for the fourth field if said each of the received MAC frames does not include the fourth field.

* * * * *